United States Patent
Wolinsky et al.

(10) Patent No.: US 11,943,387 B1
(45) Date of Patent: Mar. 26, 2024

(54) SYSTEM AND METHOD FOR INTERCEPTING AND INTERDICTING TELEPHONE FRAUD

(71) Applicant: Sentien Corporation, Stamford, CT (US)

(72) Inventors: Robert Wolinsky, Fairfield, CT (US); Jonathan Wolinsky, Stamford, CT (US); Sunil Lingayat, Issaquah, WA (US); Thomas Funk, Littleton, CO (US)

(73) Assignee: Sentien Corporation, Stamford, CT (US)

( * ) Notice: Subject to any disclaimer, the term of this patent is extended or adjusted under 35 U.S.C. 154(b) by 0 days.

(21) Appl. No.: 17/748,947

(22) Filed: May 19, 2022

Related U.S. Application Data

(60) Provisional application No. 63/303,643, filed on Jan. 27, 2022, provisional application No. 63/190,614, filed on May 19, 2021.

(51) Int. Cl.
*H04M 3/22* (2006.01)
*H04M 3/51* (2006.01)

(52) U.S. Cl.
CPC .......... *H04M 3/2281* (2013.01); *H04M 3/51* (2013.01); *H04M 2203/6027* (2013.01)

(58) Field of Classification Search
CPC ...... H04M 3/56; H04M 3/436; H04M 3/2281; H04M 3/51; H04M 2203/6027
See application file for complete search history.

(56) References Cited

U.S. PATENT DOCUMENTS

| | | | | |
|---|---|---|---|---|
| 5,638,434 A | * | 6/1997 | Gottlieb | H04M 3/56 370/260 |
| 5,712,902 A | * | 1/1998 | Florence | H04M 3/465 379/207.05 |
| 5,963,864 A | * | 10/1999 | O'Neil | H04M 3/465 455/433 |
| 5,991,390 A | * | 11/1999 | Booton | H04M 3/523 379/265.02 |
| 6,914,964 B1 | * | 7/2005 | Levine | H04M 3/56 379/52 |
| 6,987,841 B1 | * | 1/2006 | Byers | H04M 3/42221 379/93.01 |
| 6,996,221 B1 | * | 2/2006 | Baiyor | H04M 3/56 379/206.01 |

(Continued)

*Primary Examiner* — Akelaw Teshale
(74) *Attorney, Agent, or Firm* — Foley & Lardner LLP

(57) ABSTRACT

A system and method for monitoring calls or other communications between two parties by a monitoring service. The system may be configured to determine whether the caller is a known or unknown caller. In the event that the system determines that the caller is an unknown caller (i.e., not in either of a "good" caller or "bad" caller database), then the system may process dialog between the two parties to determine whether a potential fraud is being committed. The processing may be performed using artificial intelligence (AI) in real-time. In response to determining that a potential fraud is being committed, the call may be interdicted by automatically adding a third party, such as a security agent, to the call. The system may be configured to selectively play a pre-call message to a non-subscriber of the monitoring service to notify the non-subscriber that the call is being monitored.

20 Claims, 19 Drawing Sheets

(56) References Cited

U.S. PATENT DOCUMENTS

| | | | | |
|---|---|---|---|---|
| 7,035,385 B2* | 4/2006 | Levine | | H04M 3/436 455/413 |
| 7,822,188 B1* | 10/2010 | Kirchhoff | | H04L 65/1096 379/211.02 |
| 8,078,155 B2* | 12/2011 | Linquist | | H04L 65/1096 455/445 |
| 8,107,609 B2* | 1/2012 | Trandal | | H04M 3/42195 379/211.01 |
| 8,494,504 B2* | 7/2013 | Kirchhoff | | H04M 3/54 379/207.02 |
| 8,817,957 B1* | 8/2014 | Tirey | | H04M 3/42076 379/93.09 |
| 9,083,799 B2* | 7/2015 | Loftus | | H04M 3/5175 |
| 9,635,061 B2* | 4/2017 | McCormack | | H04L 65/1104 |
| 10,038,782 B2* | 7/2018 | Ou | | H04M 3/42221 |
| 10,530,928 B1* | 1/2020 | Ouimette | | H04M 3/5158 |
| 10,536,278 B1* | 1/2020 | Donaldson | | H04L 9/3247 |
| 10,601,996 B1* | 3/2020 | Holman | | H04M 3/533 |
| 11,558,435 B1* | 1/2023 | Krasso | | H04L 65/403 |
| 2006/0126806 A1* | 6/2006 | Trandal | | H04M 1/663 379/88.26 |
| 2006/0142012 A1* | 6/2006 | Kirchhoff | | H04M 3/54 455/445 |
| 2008/0043964 A1* | 2/2008 | Majors | | H04M 3/42221 379/202.01 |
| 2010/0272245 A1* | 10/2010 | Brunson | | H04L 65/403 379/202.01 |
| 2010/0316207 A1* | 12/2010 | Brunson | | H04M 3/56 379/202.01 |
| 2013/0343205 A1* | 12/2013 | Dolan | | H04M 3/436 370/250 |
| 2014/0037080 A1* | 2/2014 | Chakra | | H04M 3/56 379/202.01 |
| 2014/0098947 A1* | 4/2014 | Dingsor | | H04M 3/565 379/202.01 |
| 2017/0078338 A1* | 3/2017 | Arora | | H04L 65/1093 |
| 2017/0366675 A1* | 12/2017 | Broadworth | | H04L 65/403 |
| 2020/0176003 A1* | 6/2020 | Magdina | | H04L 63/1475 |
| 2021/0075632 A1* | 3/2021 | Kapinos | | H04L 65/1093 |

* cited by examiner

TELEPHONE FRAUD PROBLEM

100A

TELEPHONE FRAUD SOLUTION

100B

SYSTEM FOR REDUCING CALL LOAD THROUGH
FRAUD CALL MONITORING SYSTEM
800

SYSTEM FOR AUTOMATING BLACKLIST GROWTH
IN A FRAUD CALL MONITORING SYSTEM
900

SYSTEM AND METHOD FOR INTERCEPTING AND INTERDICTING TELEPHONE FRAUD

CROSS-REFERENCE TO RELATED PATENT APPLICATIONS

This application claims priority from Provisional Application U.S. Application 63/190,614, filed May 19, 2021, incorporated herein by reference in its entirety. This application claims priority from Provisional Application U.S. Application 63/303,643, filed Jan. 27, 2022, incorporated herein by reference in its entirety.

BACKGROUND OF THE INVENTION

Telephone Fraud

Each year, millions of elderly Americans fall victim to some type of financial fraud or confidence scheme, including romance, lottery, and sweepstakes scams, to name a few. In committing the fraud, criminals gain the trust of their targets and communicate with them directly via computer, phone, and the mail; or indirectly through the TV and radio. Once successful, fraudsters are likely to keep a scheme going because of the prospect of significant financial gain. Fraudsters commonly retarget victims, exposing them to continued and greater levels of loss.

Seniors are often targeted because they tend to be trusting and polite. They also usually have financial savings, own a home, and have good credit—all of which make them attractive to fraudsters. In addition, seniors commonly may suffer from varying degrees of cognitive decline, therefore, making them potentially more trusting and less able to identify a fraudulent proposition.

Furthermore, seniors may be less inclined to report fraud because they do not know how, or they may be too ashamed at having been scammed. Seniors might also be concerned that their relatives will lose confidence in their abilities to manage their own financial affairs and, as a consequent, lose financial independence. And when an elderly victim does report a crime, they may be unable to supply detailed information for law enforcement to act upon.

The U.S. government and various private institutions have set up hotlines for reporting elder financial abuse. Unfortunately, the vast majority of elderly suffer varying levels of cognitive decline and, as such, may never become aware of the financial fraud; sometimes until all their savings have been lost. Consequently, hotlines have not stemmed the tide of senior financial fraud.

Fraudsters rely on the cognitive decline affecting seniors and their inability to either recognize a crime has occurred or report enough information to authorities. Consequently, senior financial fraud is a very lucrative business where perpetrators have little to no prospect of being caught or receiving punishment. Many scam artists are domiciled outside the U.S.

Various U.S. government and NGO estimates place senior financial fraud between $30-$50 billion, annually, and there are an estimated 3.5 million senior fraud instances in the U.S. each year. These estimates may be low because much of the fraud is never reported. Since most seniors cannot or intentionally do not report a fraud, and their adult children may never know about the fraud or discover the fraud after it is too late, it is really difficult to know the full extent of the problem. Some authorities say the actual national loss could be double the estimates.

Elder abuse victims—including those who suffer financial exploitation—die at a rate three times faster than those who haven't been abused. The U.S. Centers for Disease Control and Prevention call elder financial fraud a public health crisis.

In more recent times with so much of senior's money being lost to fraud each year, there have been a few attempts at designing systems, including apps, that look at the financial activity of seniors in order to alert adult children and financial caregivers of suspicious behavior. According to experts, getting seniors to pass access or control of their assets, cash and property over to their adult children or allowing adult children to peer into a parent's finances is like getting them to give up the keys to the car, which seniors fear is the "end of the line." While passing independence to adult children, many of whom may not be trusted in the mind of a parent, is a bridge too far for many seniors. To date, these apps have had little to no impact on the huge losses piling up due to senior financial fraud.

Many seniors lose huge amounts of money to fraud because of fear and distrust of family members, whether justified or unjustified, and the scam artists know this and, in fact, the fraudsters rely upon that disconnect between family members. Not many seniors will be letting their children use these systems and, more importantly, such apps are generally a post facto service because by the time suspicious activity is reported via an app and the senior or family member can take action, the money is gone, usually to offshore environs with little or no recourse to U.S. authorities.

According to the U.S. Centers for Disease Control and Prevention, financial judgment can start to falter before normal cognition does, regardless of whether the person was savvy with money when he or she was younger. In other words, faltering financial judgment can happen even when the person seems normal. Recently, William Webster, a former director of the CIA and FBI, a 90-year-old senior, was the subject of a financial lottery scam that included threats of violence, which suggests that financial scams can happen to anyone.

With the average estimated loss of a financial scam at $23,000, $43,700, and $39,000 for the most targeted senior demographic segments, ages 60-69, 70-79 and 80 and up, respectively, the senior fraud industry is well capitalized to open and grow a myriad of vectors unhindered by the new wireless and telephone rules designed to stem the billions of robocalls Americans receive each month.

In recent years, the telecom industry has implemented a technology approach to slow the billions of robocalls. The system is called STIR and SHAKEN. STIR, or Secure Telephony Identity Revisited, functions as a call-certifying protocol. While SHAKEN, or Signature-based Handling of Asserted information using toKENS, functions to verify the caller's right to use their phone numbers. However, the STIR and SHAKEN protocols are no silver bullet solution to stopping senior fraud and have had little impact on reducing the annual loses of senior financial fraud because STIR and SHAKEN are designed to address spam calling using spoofed telephone numbers not senior fraud calls. Additionally, even if the protocols alerted seniors of suspicious telephone calls, it is unlikely a senior suffering cognitive decline would reliably react to such notifications. A single fraud call getting through to a targeted senior could result in loss of life's savings, independence, and possibly early death as a direct effect of the loss of savings.

Crucial to understanding the senior fraud process, a telephone communication is generally used at some point in the financial fraud program, however, a phone call is not always the first step. Much of senior fraud relies on confidence-building inducements to get seniors to call the fraud businesses. Inducements may come from many non-threatening vectors, such as: television ads, friendly emails, popup computer messages, computer advertisements, personal letters and junk mail, or acquaintances. The bottom line is that STIR and SHAKEN protocols are not designed to address the myriad of vectors associated with senior financial fraud.

The NCOA (National Council on Aging) lists the Top 10 Financial Scams Targeting Seniors as: (1) Medi-care/health insurance fraud, (2) counterfeit prescription drugs, (3) funeral & cemetery scams, (4) fake anti-aging products (5) IRS Phone scams, (6) internet fraud, (7) investment/timeshare schemes, (8) homeowner/reverse mortgage scams, (9) sweepstakes & lottery scams, and (10) the grandparent scam. Many of these scams do not require telephone solicitation to be effective, but will typically use telephone communications at some point in the transaction. The fraudsters are very creative and extremely persistent.

With the elderly population growing to 22% of the U.S. general populace and seniors racking up $30-$50 billion in losses annually, elder fraud is a significant and growing problem with no solutions. Presently, the U.S. government considers elder fraud to be the largest fraud segment in the United States.

Telephone Call Management Systems

Call centers receive calls from customers who generally have inquiries, complaints, or other concerns with accounts, products, or otherwise. When a customer service representative at a company receives a call from a customer, the customer service representative typically handles the call to assist a customer. In situations where the customer service representative desires to transfer a call of a customer to a different department, for example, the call center telecommunications equipment provides a call transfer feature, where the customer service representative is able to transfer a call directly to a telephone line of another customer service representative (or manager). In the event where a conference call is desired or needed with the customer and multiple parties, the call center telecommunications equipment includes 3-way calling capabilities to add a third party, such as a supervisor. Some call center communications equipment supports a conference bridge in which multiple parties, such as the customer, customer service representative, and manager, may use the conference bridge to conduct a discussion with more than two people as an alternative to a conventional 3-way call.

In the case where the customer service representative sets up a conference bridge, the customer service representative (i) transfers the customer into the conference bridge, and then (ii) connects to the conference bridge along with the manager. When the customer service representative transfers the customer into the conference bridge, the call transfer operation causes the direct telephone call leg with the customer to be severed, and then the customer service representative calls into the conference bridge, thereby reconnecting the customer service representative and the customer within the conference bridge. Call center equipment is configured in a particular manner to enable conference bridges to be available for the customer service representative to transfer the caller to the conference bridge, which disconnects the direct call, and then enable the customer service representative to join the customer and another party, such as a manager, in the conference call. However, such specialized conference call capabilities that allow for the customer service representative to transfer a caller into a conference bridge and then join the caller on the conference bridge are not technologically intrinsic to typical telephony systems, whether PSTN, wireless networks, or VoIP/SIP networks.

Although such specialized conference systems perform appropriately for call centers, the transferring and disconnecting of a caller will not work when the caller is not calling a call center or when there is need of seamlessly adding call legs or network communications connections to the call party's call. Consequently, configuring a system to perform such a communications process is not possible because of the call being disconnected and because of other challenges with maintaining and transferring call legs using conventional communications equipment. Several variations of the process have been explored and have been unsuccessful due to a variety of technical reasons. As such, there is a need to create a system that supports alternative processes for enabling one-on-one calls and adding one or several third parties without either of the calling or called parties having to take action and without disconnecting and transferring either of the call legs of the parties.

SUMMARY OF THE INVENTION

To address and combat senior financial fraud, a system and method for monitoring telephone calls for likely fraudulent communications by scam artists, and, when appropriate, interdict the telephone call in order to protect the senior from falling victim to fraud. More particularly, a system and method may enable telephone users to purchase or subscribe to a fraud-call monitoring and interdiction service (hereinafter "monitoring service") that may operate on a computer network and use artificial intelligence, such as neural network technologies, in performing real-time analyses of telephone call conversations. The system may "sniff" telephonic communications of a protected caller, user, enrollee, customer, participant, or subscriber (hereinafter "subscriber") inbound and outbound calling, analyze the communications for language, words, phrases, voice biometric data, calling and pattern data, related technical indicia (e.g., call metadata), and other call data, for example, in order to make contemporaneous and predictive assessments that can be utilized to determine the relative safety of a telephone call.

In one embodiment, a subscriber's inbound calls are routed through a computer gateway, or fraud-call monitoring system. The system may selectably communicate an announcement, such as a recorded message, commonly known as early media, announcing to the caller or recipient, that the recipient of the call, the subscriber, is protected by the fraud-call monitoring system. In addition, the caller's telephone call information, which may include headers, metadata and other routing and identifying indicia as is known in the art, may be analyzed to determine if the call is a known "good" or "bad" telephone number stored in a database of the system, or a potential risk or unknown telephone call. The "good" and "bad" telephone numbers may be organized and stored as "whitelisted" and "backlisted" telephone numbers, (i) provided by the subscriber or surrogate, (ii) acquired through third parties, and (iii) automatically or semi-automatically accumulated by the fraud-call monitoring system. In the event the fraud-call monitoring system determines the telephone number may be a known "bad" number (i.e., a number known or determined to be associated with a fraudster), the fraud-call monitoring system may automatically terminate the telephone call without involving the subscriber. Alternatively, the fraud-call monitoring system may initiate a late media message, or cancellation message, informing the caller of the monitoring system's determination, provide remedying information and, thereafter, terminate the call, again without involving the subscriber.

In the event the monitoring system determines the inbound or outbound call is a known good number (i.e., a number known or believed to not be associated with a fraudster), the monitoring system may permit the telephone call to connect to a subscriber destination, with or without any early media message and, thereafter, cease any further examination of the telephone call. In an alternative embodiment, the monitoring system may continue monitoring the call until the parties—the subscriber and caller—exit the call.

However, the monitoring system, by elimination of known good and bad telephone numbers, may, thereafter, classify the call as either an "unknown," or a "risk" call. In the event a subscriber inbound or outbound telephone call is classified as a risk call, the monitoring system may initiate an early media message notifying the inbound caller (to the subscriber) or the recipient of the subscriber's outbound call of the fraud monitoring service activity while connecting the parties' telephone call. The message engine may be configured to generate a simple recording or function as an IVR (interactive voice response) intelligence engine. The message engine may be configured to play the message periodically (e.g., time-based, such as monthly or at selected points in a telephone call) to particular callers or recipients or aperiodically (e.g., event-based, such as every certain number of calls, randomly during a call, or otherwise). In addition to completing the connection to the subscriber, the monitoring system may initiate the risk call examination system that operates in real-time, near real-time, or post call environment.

The monitoring system may utilize a neural network to perform the call examination service. The neural network may be composed of, for example, an artificial intelligence engine, natural language processing (NLP) software, voice identification and voice biometric analysis technologies, vocal behavior analysis, facial recognition technology (for video calls), and data analysis that may execute independently without the neural network or may be collectively arrayed to facilitate input layer patterns, or data, into a multi-layered perceptron (MLP) neural network. In one embodiment, the various inputs may be used to support the neural network's hidden layers that may extrapolate salient features in the input data that have predictive power regarding the outputs, for example, assess and rank the risk potential of the monitored call. Hidden layers fine-tune the input weightings until the neural network's margin of error is minimal. The neural network's outputs may provide both linear and non-linear responses and predictive solutions to fraud detection. In real time the neural network may be configured to "sniff" or listen to risk calls for words, phrases, statements, voice identification markers, and/or voice biometrics and other such voice, facial and telephony data that may indicate the progression of a fraud call. Neural networks utilizing NLP technology are capable of operating simultaneously in several languages.

The neural network utilizing natural language processing may be designed to identify words and phrases that have a high correlation or probability to known fraud calls. For example, words, such as "money," "bank account," "cash," "gift card," "credit card," "accounts," "Social Security number," "send money," PayPal®, bank names, etc., and phrases, such as, "can you hear me?," "wire money," "why do you want my credit card number," "why do you need my credit card number?," "why do you need my birthday?," "why do you want my maiden name?," and so on may be sniffed-out and identified in real time while various voice and word nuances, phrases and juxtapositions of words may be learned and incorporated into the artificial intelligence engine. It is understood that various algorithms, word, and phrase databases may be embedded into the NLP software, artificial intelligence engine and neural network to facilitate learning and predictive interdiction processes. However, the hierarchy of a neural network in the network monitoring process may support three or more services: (1) deep understanding of both logical and non-logical conversation used in the fraud process, (2) development of precise threat responses, and (3) predictive threat response modeling, all of which can be harnessed to protect the senior subscriber from telephone related fraud.

In addition to monitoring risk calls for fraud attempts, the neural network may be configured to assess the subscriber's speech and conversations, which may be utilized as a medical and psychological tool to measure the cognitive state or relative cognitive capacity or decline, emotional state, and health of the senior subscribe. Such a subscriber health assessment tool may be used to provide the health characteristics to a medical professional or family member. The results may additionally be utilized by the neural network to increase analysis of the fraud detection (e.g., take action on a lower probability that crosses one of multiple fraud threat tiers).

In the event a threat is identified by the monitoring system, the system may incorporate a hierarchy of threat tiers, whereby each tier may initiate a preconfigured linear or non-linear response (see FIG. 4C, for example) by the monitoring system. In one embodiment, the monitoring system may be configured to identify a voice identification match to a system database of known fraud caller voices. A positive voice identification may initiate a threat tier response configured to deliver an automated late media notification ("The monitoring system has detected a potential fraud being perpetrated. This call is being terminated. Good bye.") to the fraudster and a call disconnect notice to the telephone network. The monitoring network may also provide a media message to the subscriber, whereby notifying that a fraud attempt was identified and various actions were taken by the system to prevent the fraudster from interacting with the sub scriber.

In instances where a voice match cannot be obtained or is only partially correlated, the monitoring system may be configured to "sniff" or analyze the conversation for potential fraud related words and phrases and other voice biomarkers. In the event the monitoring system identifies a threat, the system may initiate another threat tier of action whereby the telephone call may be merged with a (live) security agent located at a phone center. The security agent may identify him or herself to the parties on the call and notify the caller of being suspected of engaging in fraudulent activity. The security agent may politely place the subscriber on hold before initiating the suspected fraud-call examination. Alternatively, the subscriber may be allowed to listen to the fraud-call examination, optionally while placed on mute. In the event the security agent determines the inbound caller or recipient of the subscriber's outbound call is an attempted fraudulent communication, the security agent or network may: (1) terminate the call, (2) initiate a late media message to the relevant party as a prelude to termination, (3) store the call data including voice matching information, (4) embed the data into the artificial intelligence learning engine for improvements in threat identification speed and accuracy, (5) notify third parties, and/or (6) add the identifying data to the automated fraud-call blacklist. The system may automatically cross-correlate the collected data with data stored in a database of other "bad" calls made to other subscribers, thereby attempting to identify a fraudster. In addition, the security agent or monitoring system may reengage with the subscriber or may initiate a late media message to the subscriber explaining the result of the call examination. Optionally, various authorities and subscriber-related third parties may be automatically notified of the threat along with the conversation recording and any relevant identifying data. In an alternative embodiment, the security agent associated with the threat tier response may be an IVR security agent utilizing an artificial intelligence engine performing the functions of a "live" security agent examination and functional action steps.

In instances where a subscriber cannot provide a whitelist of "good" telephone numbers or the whitelist may be incomplete, the monitoring system may be configured to build subscribers' whitelists, thereby providing a senior suffering cognitive decay a growing envelope of safety as the years pass.

According to the principles described herein, the monitoring system and threat tier responses may be configured to automatically send alerts of a fraud stop action or other actions to subscribers via emails, text messages, apps, and the like, while adult children, caregivers, financial parties and other third parties may be notified according to the specifications of the subscriber or authorized guardian. Third parties, such as adult children, caregivers and financial parties who may have subscribed an at-risk senior to the monitoring network may also receive the monitoring system's notifications. An online dashboard, as is known in the art, may be configured to give subscribers control over the functionality and notifications of the monitoring system.

It is understood that various instances may occur where call data and voice match cannot be obtained or may be only partially correlated. In such instances, additional data such as conversation words, phrases, and intent, speech biomarkers, speech behavior profiles, facial recognition, etc., about the caller may be ranked and correlated by the neural network. In such instances, further threat tier responses may be configured to automatically stop the threat call without security agent involvement, use recorded media to communicate with the caller and subscriber, and provide various notifications to the relevant parties via automated environments.

It is also understood that various telephone and computer networks may be configured to implement a fraud call monitoring system. Traditional PSTN (fixed-wire), wireless, and VoIP/SIP networks may be configured to facilitate the directing of inbound and outbound calling of their customers' telephones through the monitoring service, or in alternative embodiment, the subscriber to the monitoring system may be a telephone user appended to the monitoring network, as in a PBX environment. Whether the telephone communication platforms are traditional PSTN, wireless or broadband-based VoIP/SIP, various network configurations may be applied to facilitate the directing of inbound and outbound calls through the monitoring system. Technical solutions for operating the monitoring system on the different communications platforms are provided herein.

Although the current summary description is largely focused on inbound fraud call monitoring, call routing, monitoring network functionality, and various response activities, the monitoring system may be configured to provide equivalent or analogous fraud call protection for outgoing calls from a subscriber of the monitoring system.

By using a combination of advanced AI (artificial intelligence) and machine learning technologies, databases, and call routing technologies, the call monitoring system may build a virtual impenetrable wall of security around each subscriber, thereby forcing telephone scam artists to confront challenging and growing computing horsepower on each and every call. And, as with any business, fraudsters have to run efficient outbound and inbound telemarketing campaigns to stay in business. Placing telephone calls costs time and money, even for a fraudster. Once a telephone number becomes identified to the fraudster as a subscriber of the monitoring service, the likelihood of future scam calls diminishes. In all probability, fraudster operations will begin blocking monitoring system subscriber telephone numbers in order to direct valuable resources to seniors not protected by the monitoring system. In the long run, a fraud monitoring and interdiction service as described herein may diminish the likelihood of subscribers receiving fraud telephone calls and reduce fraud call loads examined by the fraud-call monitoring system.

BRIEF DESCRIPTION OF THE FIGURES

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1A:
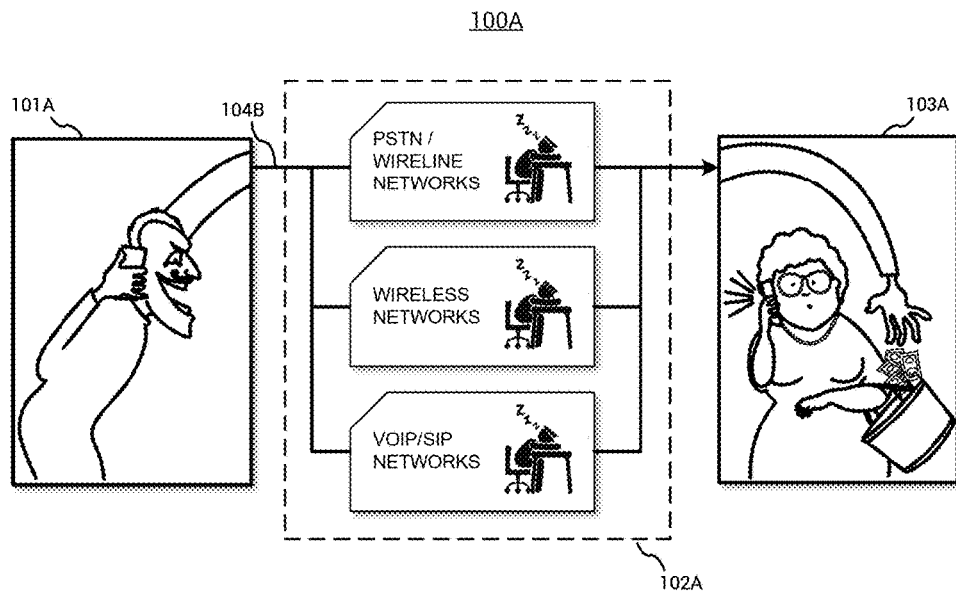
FIG. 1A is an illustration of the telephone fraud problem inclusive of the helplessness of several telephone and data networks' to stop misuse of their communications platforms.

With regard to FIG. 1A, an illustration of a telephone fraud problem 100A commonly associated with older individuals is shown. A fraud perpetrator 101a, or fraudster or scammer, is shown to be using a telephone (e.g., mobile telephone, wireline telephone, or other networked communications device) to communicate via a public switched telephone network (PSTN), wireless communications network, and/or voice over Internet protocol (VoIP) network 102a to a senior citizen 103a, who is a target of the telephone scam. It should be understood that a telephone scam may be performed via a computer communication or any other data or non-data communication, as well. The target (e.g., elderly person) may be induced to provide credit card, banking and other privileged information to the fraudster resulting in a financial or other property loss. The senior 103a may also be induced to call the fraudster. However, success of perpetrating a telephone-based fraud is the knowledge of the fraudster that the various telephone and data communications networks 102a have not developed an effective security system to stop fraud-related calling and, therefore, do not protect the senior or other person from receiving these calls and the financial loss associated with such telephone communications. Fraud or scam calls should not be confused with the spam calling, whereby telco carriers may use several technologies to identify and screen-out spam calls to varying levels of success. In addition, scam calls may come from legitimate phone numbers and individuals known to the target and, as such, these calls can evade most spam detection systems. Only one fraud call needs to get through to a susceptible target and a life can be ruined.

Figure 1B:
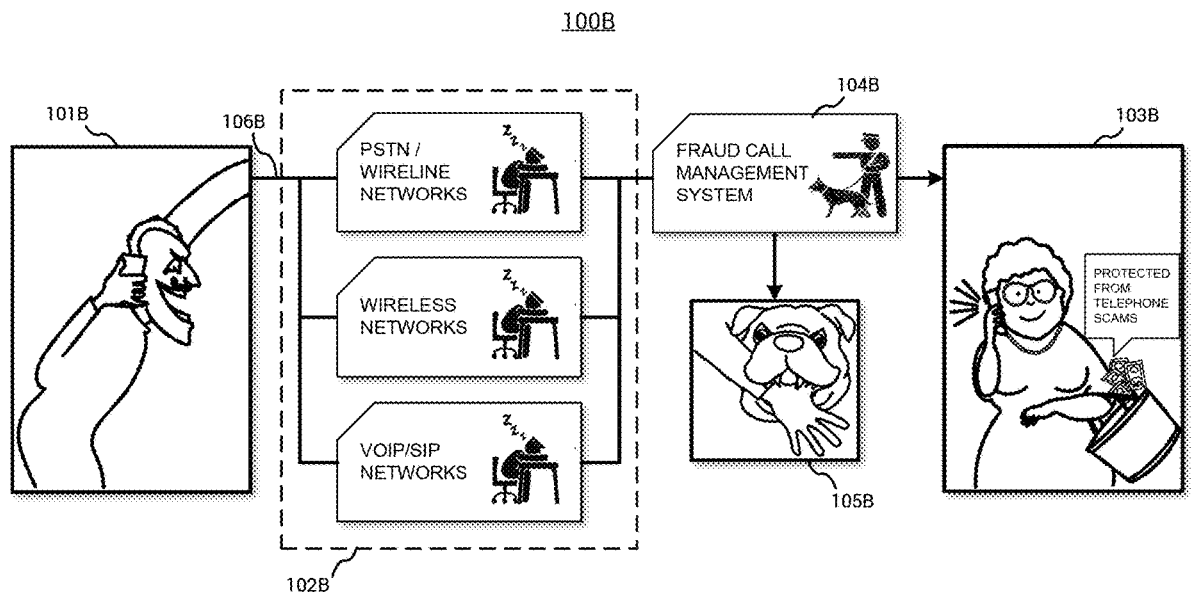
FIG. 1B is an illustration of the telephone fraud problem solution inclusive of telephone fraud management system that can be configured to reduce or stop telephone call fraud.

With regard to FIG. 1B, an illustration of a telephone fraud solution 100B is shown. The telephone fraud solution 100B may be composed of a call monitoring system 104b, which may include compatible network and technology with the telco and data carriers 102b that may be integrated seamlessly into the telephone communications process in order to detect and screen out fraud related calls, thereby minimizing or keeping a senior safe from telephone fraud-related financial loss. Although described as a senior, it should be understood that any person may be susceptible to fraud calls, but seniors are especially vulnerable due to a reduction in cognitive capabilities. Hence, the term senior should be understood as being any person. In the instant example, the fraudster 101b may call 106b the senior 103b. The fraudster's call 106b may be routed through one or more of the networks 102b to the fraud call management system 104b, whereby call 106b are subjected in real-time to various analytical systems including artificial intelligence (e.g., neural network) capabilities, for example, before and during the call in progress with the senior 103b, to determine if the call is a safe call or bad call. In the event the fraud call management system 104b determines the call 106b is a "bad call," and depending on the point-in-time of the call 106b when the determination is processed, the system may utilize a call intercept process 105b to optionally stop the call 106b. The call intercept process 105b may include opening a call leg and, therefore, joining the in-progress call with a security agent, not shown. Alternatively, a "safe call" determination of the fraud call management system may cause call safety monitoring to cease, at least for the current call and possibly for a predetermined time or number of calls going forward, for example. It should be understood that the fraud call management system can be configured to protect the senior from frauds associated with incoming calls as well as frauds associated with outgoing calls from the senior to an unknown party. In order to become protected by the fraud call management system, the senior may become a subscriber (or other participant type) of the monitoring service.

Figure 2:
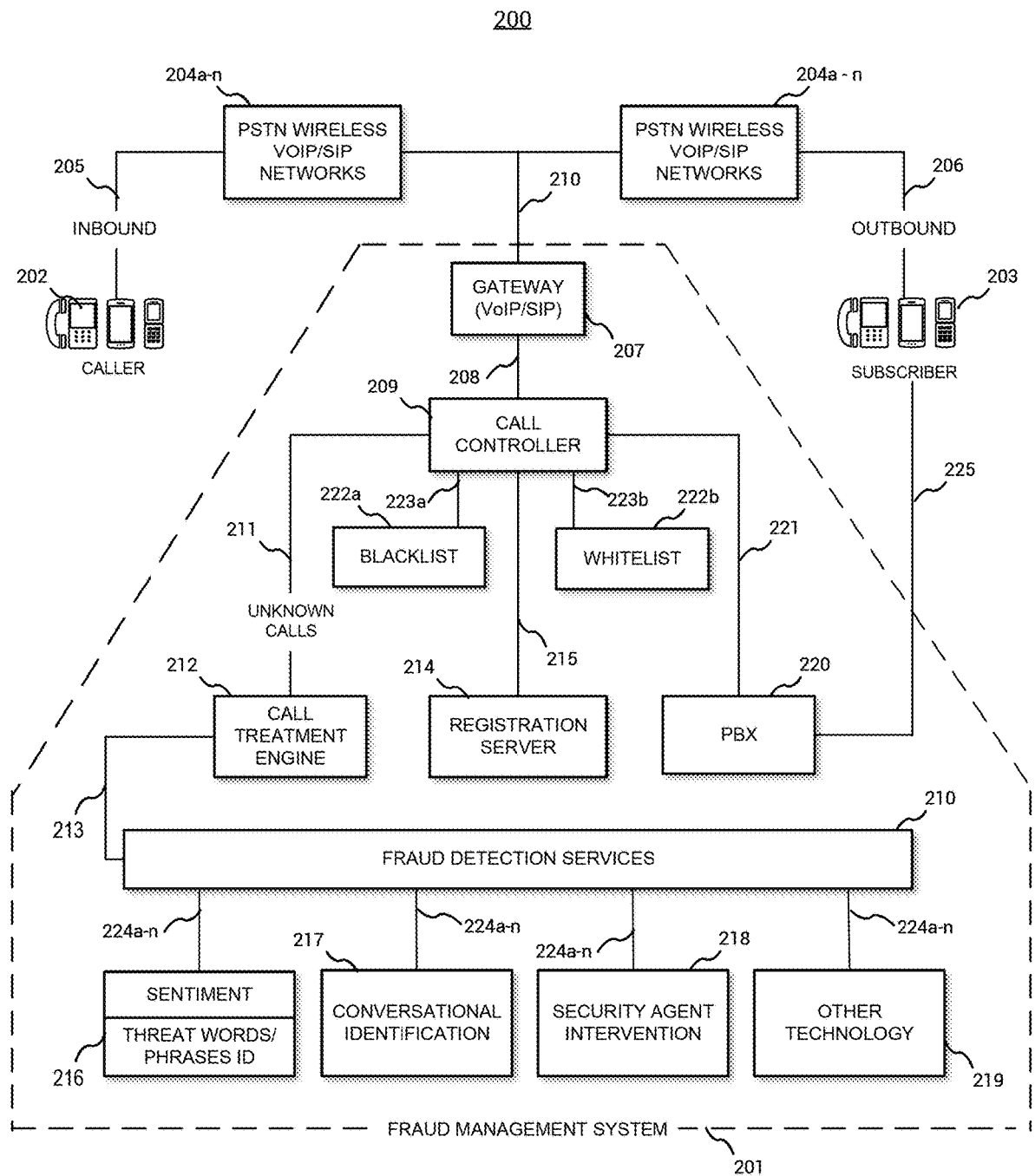
FIG. 2 is an illustration of an illustrative environment in which a telephone fraud monitoring and interdiction system may operate in connection with PSTN-wireline (fixed-line), wireless and VoIP/SIP telephone networks.

With regard to FIG. 2, an illustration of an illustrative environment in which a fraud call management system 200, or telephone fraud-call monitoring interdiction system, may operate is shown. The telephone fraud-call management system 201 is shown to be expanded to include a number of architectural components, including both hardware and software, as further described hereinbelow.

The fraud management system 201 may: (i) distribute calls, (ii) open and close call-legs, (iii) apply technical and non-technical services to subscriber inbound and outbound calling, (iv) control gateway functionality in order to determine and respond to legitimate and non-legitimate telephone calls, and (v) engage appropriate responses necessary to stop a fraud related call. This technological environment may include a caller 202 and a subscriber 203 of the interdiction system, one or more PSTN telephone and wireless networks and data communications networks such as a voice over Internet protocol (VoIP) or session initiation protocol (SIP) 204*a*-*n*, and fraud call interdiction technologies, such as, blacklist 220*a* and whitelist 220*b* lookup servers and fraud detection services 210 for processing known and unknown telephone calls, both inbound 205 to the subscriber and outbound 206 from the subscriber to a call recipient. As shown, inbound 205 and outbound 206 calls may communicate 210 with a monitoring system proxy server/gateway 207, or data center, that receives instructions 208 from a call controller server 209, whereby calls may be processed by the monitoring system. The procedure for directing inbound and outbound calling to the proxy server/gateway 207 may vary according to the software and architecture of the various telephone and data networks. In one embodiment, the proxy server/gateway 207 may be based on SIP architecture, or other similar systems, and may be configured or directed via the call controller 209 to perform specialized technical actions in response to inbound and outbound calls. For example, the proxy server/gateway 207 may be configured to, (1) play a message to the caller or call recipient, (2) communicate 223*a* and 223*b* to the blacklist 222*a* and whitelist 222*b* lookup servers, (3) route a call, (4) open and close call legs, (5) establish a conference call, and (6) communicate 213 and open call legs to analytical technologies and call intervention services 210, which may include speech-to-text processing, voice recording and voice biometric analysis, and so on. In another embodiment, the proxy server/gateway 207 may receive operational instructions via an API in connection with the call controller server 209, or the proxy server/gateway 207 may be configured with an integral call controller 209.

The blacklist 222*a* and whitelist 222*b* lookup servers may determine whether the inbound call 202 is a bad call, good call, or unknown call. Upon such determination, instructions 223*a* and 223*b* may be communicated to the call controller 209 or gateway 207, whereby the call may be; terminated while in progress or before the parties begin a conversation; connected; or if the call is unknown, the call controller 209 may communicate instructions 211 to the call treatment engine 212, whereby the unknown call will be further processed by the fraud detection services 210 in accordance with instructions 213.

The call treatment engine 212, or call management engine, may be composed of one or more servers, either dedicated or non-dedicated, configured to communicate 213 to the fraud detection services 210 to execute specialized phone call treatments as herein below further described in paragraph 70. The call treatment engine 212 may execute the fraud detection services 210 by communicating 211 to the call controller 209 the opening and closing of call legs 224*a*-*n* to the various fraud detection and intervention services. In an alternative embodiment, the call controller 209 may be configured to receive the inbound unknown call 205 into a conference bridge environment, whereby the call controller may open and close legs to the fraud detection and intervention services 210, as required, and open or close an outbound call leg 206 to the subscriber 203.

The call controller 209 may communicate instructions 215 with the registration server 214 to assign specialized routing information to inbound and outbound calls. For example, and in one embodiment, in the event the subscriber's telephone operates on a SIP network, the registration server may assign header information to the IP routing of the call, in order to direct the call to an address that may be configured to prioritize voice traffic of a data network, and, therefore, minimize the time and length the voice data stream remains on the non-prioritized segment of the Internet, or last mile. Or, in the event of traditional PSTN or wireless calling, the registration server may assign additional header information or an invisible telephone number to facilitate routing of calls in and out of the proxy server/gateway 207. It should be understood, there may be various alternative architectures that can be configured to accomplish call routing across disparate networks, however, the identified components illustrated herewith may be configured into these alternative schemes.

In another embodiment, the subscriber's telephone may be configured as an address communicating 221 to a PBX (private branch exchange) telephone system 220. The PBX 220 may operate as a component of a SIP communications network or such other configurations as is known in the art. In this embodiment, the subscriber's calling 225, both inbound and outbound, may be routed through the call controller, thereby permitting the telephone fraud-call monitoring interdiction system 201 to operate on the subscriber's inbound and outbound calls.

In an additional embodiment, the call controller 209 may utilize databases 222*a* and 222*b* of "whitelisted" and "blacklisted" telephone numbers to prescreen inbound and outbound calls. The call controller 209 may, periodically or aperiodically, apply a recorded message and/or tone(s) to the call. The message may notify one or both parties that the call is being monitored by the fraud monitoring system 201, as further described herein. The tone(s) may be used as an indicator, such as a source identifier, of the call being monitored by a particular company. In one embodiment, the message may be applied to the call before the system connects the parties, giving the fraud caller the option of hanging up, therefore, saving monitoring system resources and reducing costs of operation. Alternatively, in the event the call appears on the whitelist database 222*b*, the recorded message may or may not be applied. In the event the call controller 209 determines the telephone number appears on the blacklist database 222*a*, the controller may terminate the call with or without initiating a recorded message. Data associated with the caller may be stored by the fraud monitoring system 201.

In the event the call controller 209 determines the called or called party is "unknown" because it is not listed on the system's whitelist 223*b* and blacklist 223*a* databases, the call controller 209 may engage the call treatment engine 212 to further ascertain the safety of the telephone number and conversation of the call. The call treatment engine 212 may, for example, evaluate in real time the conversation of the parties for fraud related threats that may include as shown (i) applying various conversation sentiment and voice and speech analysis technologies 216, (ii) identify the parties engaged in the monitored call 217, (iii) instruct the call controller to merge a third party (e.g., an authorized security agent, guardian, family member, caregiver, etc.) into the call 218, (iv) apply other technologies and services as can be used or developed to analyze the nature of a call 219, and (v) rank the call for monitoring system responses. In the event the "unknown" call is determined by the system to be a safe or unsafe call, the system may update the whitelist 222b and blacklist 222a databases and, therefore, create an automated subscriber whitelist and blacklist without need of subscriber input. The system may be applied to inbound calling to a subscriber of the monitoring system or outbound calling of a subscriber.

Figure 3:
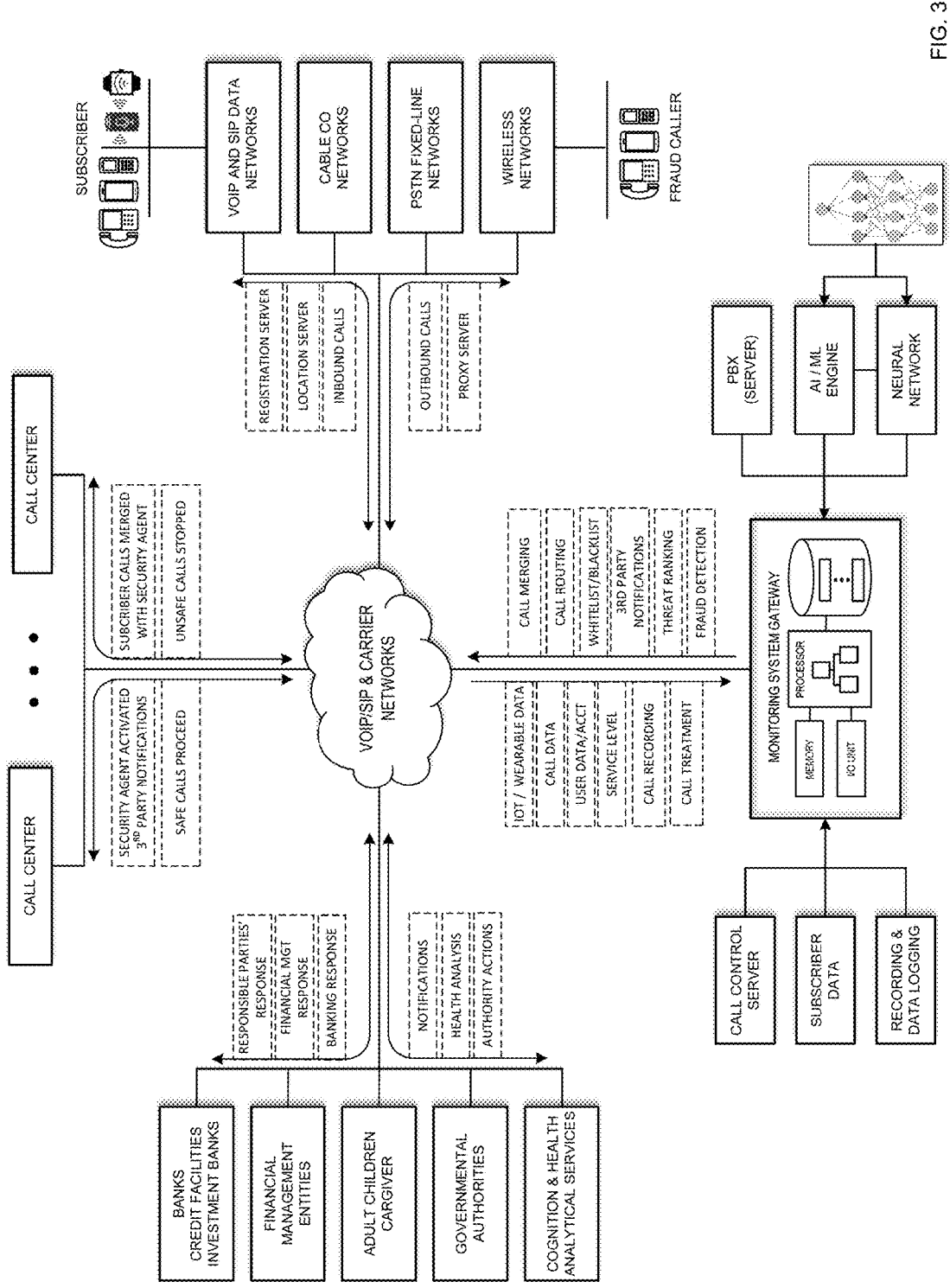
FIG. 3 is an illustration of a telephone fraud-call monitoring system environment in which the system may be utilized to protect subscribers.

With regard to FIG. 3, an illustration of a network environment in which a telephone fraud-call monitoring network may operate is shown. The network environment may include: (i) telephone call networks, such as traditional telephone carriers, cable telephone networks and VoIP/SIP data networks, (ii) a call center to assist subscribers, assess the risk of suspected fraud calls, stop fraud calls, and perform notifications to third parties, (iii) a monitoring system gateway which may include one or more servers to support the proper functioning of the fraud-call monitoring and interdiction system, and (iv) third parties that may include: banking and financial entities, governmental authorities, adult children, caregivers, health service providers, and/or analytical services. In the event that a third-party does not answer the call, the system may be configured to continue to attempt to add another third party until one is added to the call or a timeout occurs, in which case the call may be dropped and a message may be played to call back later. Information may be collected from the call and relayed to a third party, such as caller ID information (e.g., caller name, phone number, etc.). In an embodiment, a partial recording of the call that gave rise to the system attempting to add the third party may be stored in association with the information of the non-subscriber caller.

The monitoring system gateway may include (i) a neural network server, (ii) an artificial intelligence server, (iii) a subscriber data server, (iv) a call control server, (v) a PBX system, and (vi) a recording and data logging server, all of which may be configured on one or several servers and be configured to perform the various functions. The server(s) include a processor and software being executed on the processor that perform neural network and AI (artificial intelligence) and database processing functions responding to inbound and outbound telephone conversations of subscribers of the monitoring network. Neural network and AI activities may be configured to perform speaker identification, voice biometrics, call meta data analysis, word and phrase identification, contextual understanding, caller sentiment analyses, conversation risk assessments, health assessments, risk-call ranking, and response assignments. In addition, the software may be configured to store and operate recording of threat conversations and maintain subscriber data and various recording and data logging activities.

The monitoring network gateway may route calls from telephony carriers and VoIP/SIP networks to destinations including a PBX, merge calls in real time with security agents located in a call center and, in the event a conversation or calling data threat has been identified by the system, perform a hierarchy of responses to stop the threat and make appropriate notifications to third parties. In one embodiment, telephony carriers and VoIP/SIP networks may route inbound and outbound calling to the monitoring system gateway. In another embodiment, the system may be configured to route its subscribers' inbound and outbound calling to the monitoring system gateway and calling destinations. The monitoring system may connect the call to its intended destination, play early media notifications and/or tone(s) to the caller or unknown party, perform various real-time fraud analytical call and conversation "sniffing" functions and data analysis of the call necessary to determine if the call is from a known or unknown party, or a safe call or unsafe call. In the event the monitoring system determines the unknown caller or party has spoken certain words or phrases that may indicate the call is not safe, the monitoring system may, in real time, rank the threat of the call and merge the call with a monitoring system human security agent located in a call center.

Once the call is merged with the security agent, the security agent may place the subscriber on hold, interview the suspected fraud caller or party, terminate the call, alert and provide information and data about the fraud call to third parties and authorities, and notify the subscriber that the threat has been addressed. Rather than connecting with a human security agent, an interactive voice response (IVR) system may be utilized, optionally as a less expensive subscription or to perform an initial filtering or data gathering of the caller prior to connecting the caller or recipient, if a subscriber placed the call, with the human security agent. A fraud call may initiate various system functions that may be used to thwart future calls by the same fraud caller including, accumulate into a database voice print and voice biometrics data, whitelist and blacklist numbers, IP address and metadata, and other such information that may identify the fraud caller, and facilitate the system's ability to predictively determine fraud patterns and responses.

Figure 4:
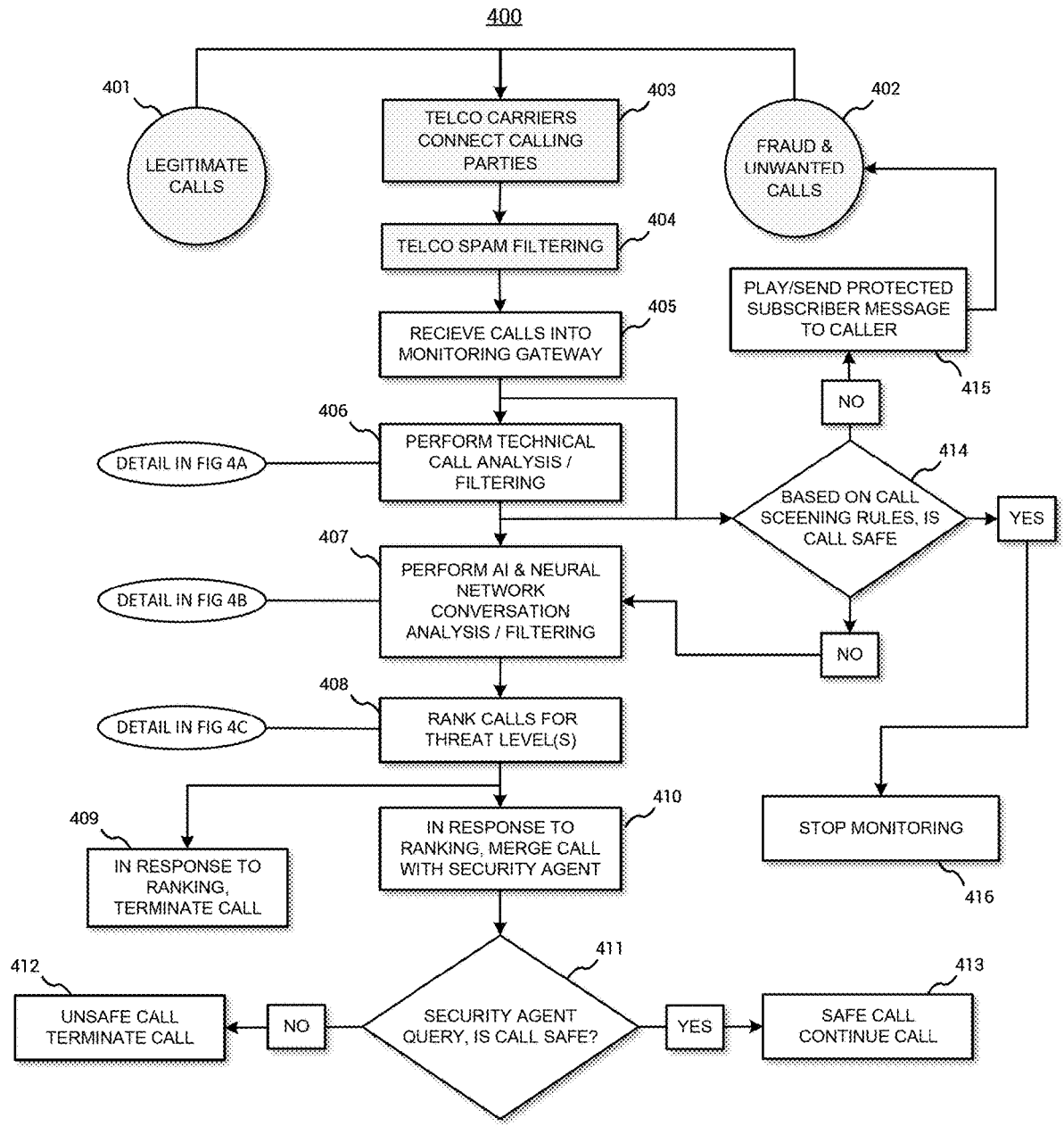
FIG. 4 is a flow diagram of an illustrative process used by a telephone fraud-call monitoring system to identify safe or unsafe calls, rank calls, and assign system responses.

With regard to FIG. 4, a flow diagram of an illustrative process 400 used by a telephone fraud-call monitoring system to determine legitimate 401 and not legitimate 402 telephone calls, or safe and unsafe calls, and to engage appropriate responses necessary to stop a fraud caller is shown. The calls may be routed through PSTN telephone (fixed-line) and wireless carrier networks and VoIP/SIP data networks 403, whereby spam filtering technology 404 such as SHAKEN and STIR protocols and other spam identification technology, as is known in the art, is utilized to filter out spam calling. Calling may be directed to a proxy server/gateway or data center 405 whereby the inbound and outbound calls may be processed by the fraud-call monitoring system.

Upon receipt of an inbound call to a subscriber or an outbound call from the subscriber and while the call is connecting the parties, the proxy server/gateway 405 may play a recorded message or IVR (interactive voice recording) message notifying the party or parties that the call is being monitored. The technical analysis layer 406 of the system may compare the inbound call data to several lookup and comparison databases. For example, a whitelist of the subscriber and a blacklist of the system inclusive of metadata and other telephone communications identification data may be used to validate the safety of the call. Based on rules and in the event the call is determined to be a safe call 414, further system fraud-call monitoring may be stopped 416. Alternatively, in the event the technical analysis layer 406 of system determines the call is a known bad number, blacklisted number or has questionable metadata 414, the system may stop the call before or upon connection with the subscriber. The technical analysis layer 406 may instruct the proxy server/gateway 405 to play a recorded message 415 notifying the caller of the system's determination. In the event the technical call analysis layer cannot identify the inbound call as a good call or bad call 414, the call may be designated as an "unknown-call" or "risk-call" by the system.

In the event an unknown-call designation is assigned to the call, the system may connect the call to its intended destination while performing additional scrutiny 407 in real time. In one embodiment, the unknown called or called party's conversation may be analyzed by an AI (artificial intelligence) engine and neural network, or cognition system 407. The AI conversation analysis 407 may perform various call assessments as follows: (i) identify fraud related words and phrases spoken by the parties (i.e., words, such as "money," "bank account," "cash," "gift card," "credit card," "account," "Social Security number," PayPal®, bank names and the like, or phrases, such as, "send money," "wire money," "can you hear me or," or "hello grandma, it's your grandson. I am in jail," etc.), (ii) determine risk caller intent, (iii) perform voice identification and voice biometric analysis and the like, (iv) perform facial recognition of the risk caller in the event of a video call, and (v) make probabilistic and statistical risk assessments and projections related to the call and caller.

The AI cognition system may employ a rules-based ranking engine 407 that may rank the unknown party's conversation for responsive monitoring system actions, for example, terminate the call 409, execute various notifications, or merge or conference bridge the call with a phone center where a security agent 410 of the monitoring system may query or interrogate 411 the suspected fraud call or called party and make a determination regarding the safety of the call. In the event the security agent determines the call is unsafe, the security agent call may terminate the call 412. Or, alternatively, in the event it is determined to be a safe call 413, the call may continue and monitoring stopped. Notwithstanding the security agent's disposition of the call, the call and its associated data will be automatically entered into the monitoring and interdiction system databases to further improve the whitelist or blacklist, voice identification and voice biometric capabilities of the system.

Because the fraud-call monitoring system may be configured to "sniff" the call conversation 407, the monitoring system may identify in real time that the subscriber is speaking confidential information, such as a bank account number or credit card number. In an embodiment, the monitoring system may be configured to automatically prevent the caller or called party from hearing at least a portion of a conversation whereby confidential information may be exposed. Such action may occur after determining that the probability of a fraud being perpetrated exceeds a rules-based fraud threshold. For example, if the monitoring system automatically identifies certain alphanumeric words (e.g., numbers, letters, etc.) being spoken by a subscriber are associated with a bank account, credit card, debit card, date of birth, mother's maiden name or other confidential information, then the monitoring system may automatically prevent the a party from hearing further words, either temporarily or until the call can be interdicted by a security agent. The prevention may occur by a tone or "beep" being produced, the subscriber being automatically muted, or any other technique to prevent the subscriber's confidential information from being heard by the other party. For temporary prevention, the system may produce a tone as numbers or words associated with confidential information are spoken and potentially heard, possibly with added time. Thereafter, a notification may be played to the subscriber that the information was prevented from being heard by the other party.

In an embodiment, the monitoring system may enable the subscriber or authorized agent for the subscriber submit various types of confidential information, such as bank name, date of birth, credit card names, numbers, expiration dates, verification codes, bank card PIN, mother's maiden name, healthcare information, computer login names and/or passwords, or any other personal or confidential information that a fraudster may utilize to access money or other information about a subscriber. In an embodiment, to prevent a computer hacker from calling and accessing or taking over control of a computer, the system may "sniff" words being spoken by the non-subscriber and actively notify the subscriber to turn off or deny a computer request, such as to give control to a non-subscriber during a "computer maintenance" process.

The principles described herein may be applied to text messaging and non-phone communications devices or devices that operate as nodes of Internet of things (IoT), such as watches, thermostats, interactive voice response (IVR) devices (e.g., Amazon's Alexa® IVR devices), computers, television remote controls, etc. By capturing speech from the IoT devices and processing the collected speech, discussions with family and caretakers with a subscriber may be monitored for fraudsters as fraud from family and/or caretakers amounts to a significant percentage of financial fraud committed against the elderly. For these devices, the communications may be initially routed through a system for AI processing in the same or similar manner as that shown herein to identify and filter or otherwise prevent confidential information from being passed to a third-party system. The monitoring system may automatically generate and send a notification to a security agent and, in an embodiment, enable the security agent to communicate with the subscriber and fraudster if the IoT device has such capabilities (i.e., two-way communications), thereby enabling the security agent to interface with and interdict the potential fraudster in real time.

Figure 4A:
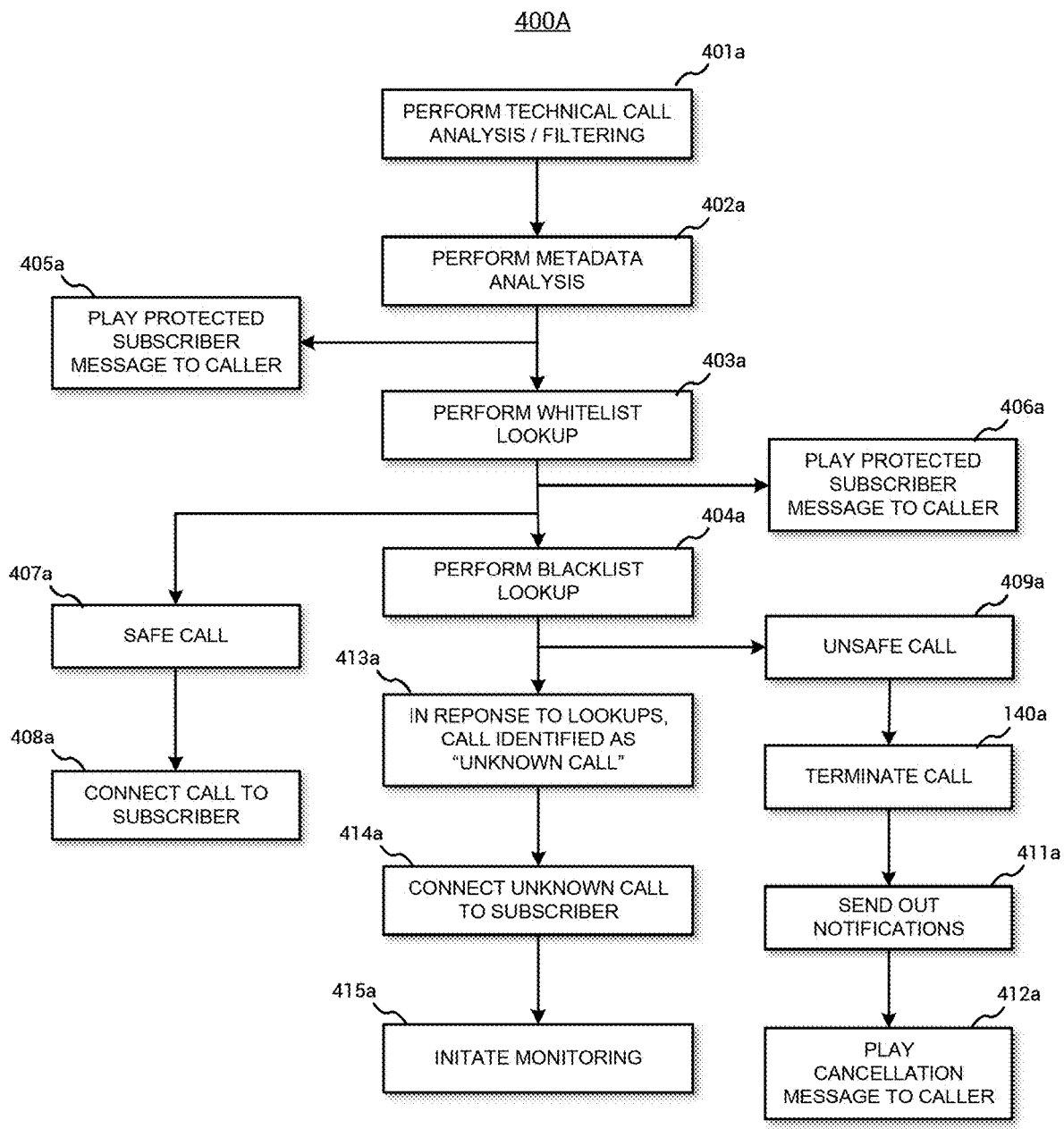
FIG. 4A is a flow diagram of an illustrative process used by a telephone fraud-call monitoring system to provide technical filtering of calls inclusive of whitelist and blacklist lookup in order to identify safe calls from unsafe telephone calls and assign system responses.

With regard to FIG. 4A, a flow diagram of an illustrative process 400A (from FIG. 4, detail 406), used by a telephone fraud-call monitoring system to perform rules-based technical analyses on inbound and outbound calls in order to determine if the call is safe or unsafe is shown. The technical analysis 401a may comprise increasing levels of scrutiny that may include metadata analysis 402a (e.g., geographical lookup, caller ID lookup, etc.), whitelist 403a and blacklist 404a lookups, and other such activities that can be used to identify the relative safety of an inbound or outbound call. At various intervals during the technical analysis 401a, a recorded message 405a and 406a may be played, notifying the caller or unknown party that the subscriber is protected by the fraud-call monitoring system. In the event the technical analysis 401a determines the call is "safe" 407a, the monitoring system may connect the parties 408a, thereby permitting the call to proceed. Alternatively, in the event the technical analysis determines the call is "unsafe" 409a, the system may terminate the call 410a, send out notifications to third parties and the subscriber 411a, and play a cancellation message 412a to the caller. In the event the technical analysis process cannot determine whether the call is safe or unsafe, the monitoring system may identify the call as "unknown" or a "risk-call" 413a. The monitoring system may connect the parties 414a and initiate further fraud-call monitoring processes 415a. It should be understood that the technical analysis process can be configured to screen all inbound calls to a subscriber of the monitoring system and all outbound calls from a subscriber to known and unknown telephone numbers and parties.

Figure 4B:
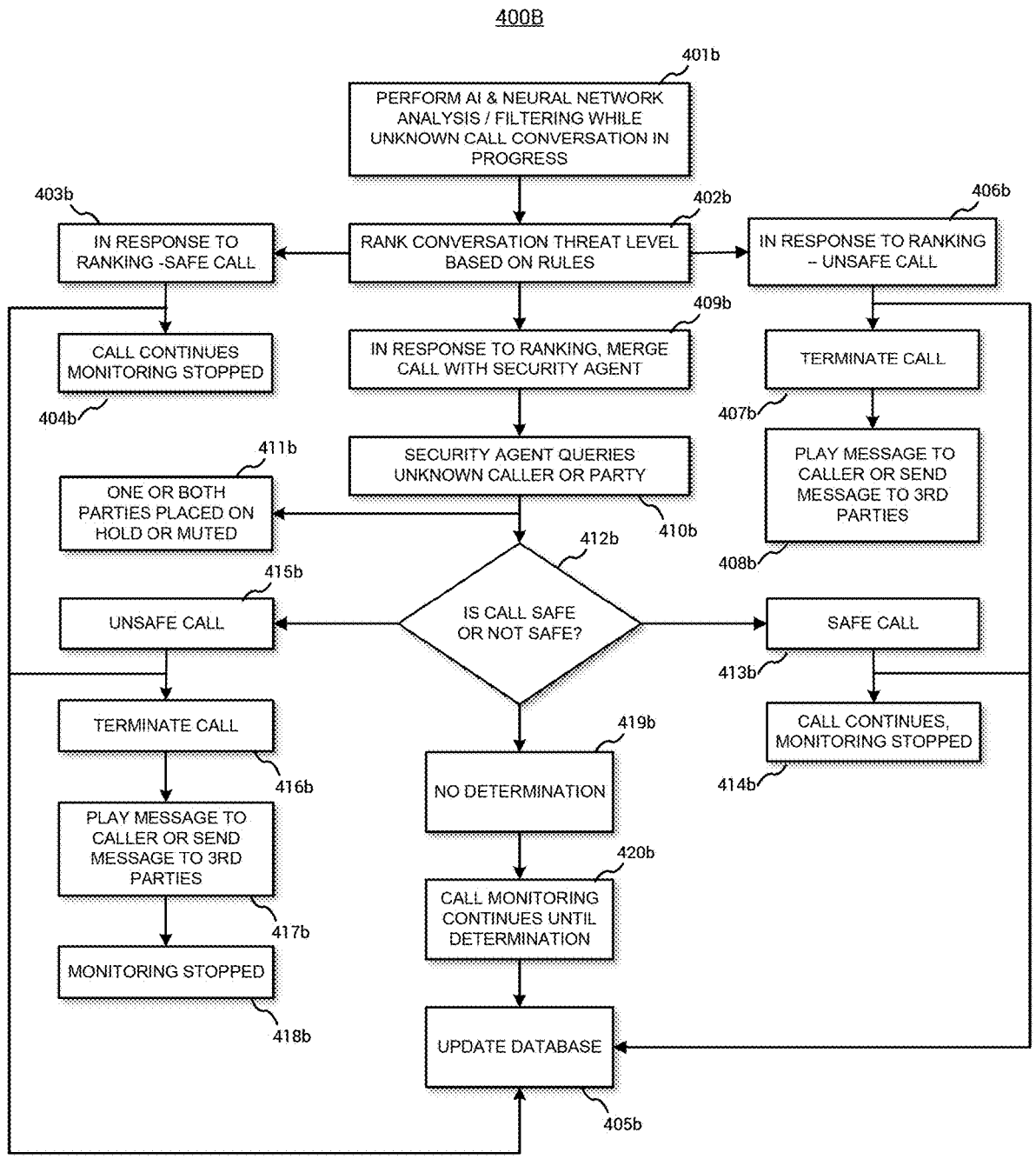
FIG. 4B is a flow diagram of an illustrative process used by a telephone fraud-call monitoring system to provide AI and neural network-based conversation analysis in order to rank calls and assign system responses.

With regard to FIG. 4B, a flow diagram of an illustrative process 400B (from FIG. 4, detail 407), for a telephone fraud-call monitoring system to perform real-time conversation analysis on calls classified by the monitoring system as an "unknown" or "risk" calls is shown. In one embodiment, the monitoring system may use an AI cognition system 401b, as previously described, to assess and compute the probabilities and indexing (ranking) of fraud-call conversation threats from an unknown caller or party. The AI cognition system 401b may utilize automatic speech recognition technology, word and phrase identification technologies, language understanding which may include analysis of caller intent and sentiment technology, voice biometric identification, IVR capability, facial recognition technology (for video calls), and other such tools and technologies that may be incorporated into the AI cognition system 401b to aid in the call ranking process.

The monitoring system, based on rules, may rank the conversation as a "safe" or "unsafe" call 402b. In such event and pursuant to the ranking, a safe call 403b may stop the fraud-call monitoring process 404b while updating the system database 405b with additional and possibly new "safe call" data that can further inform the fraud-call monitoring process on subsequent calls. Alternatively, in the event the call is ranked unsafe 406b, the monitoring system may terminate the call 407b, play a cancellation message to the caller and send out notifications to third parties and the subscriber 408b, and update the system database 405b with additional and possibly new "unsafe" call data that can further inform the fraud-call monitoring process on subsequent calls. In another embodiment, the conversation analysis ranking process 402b may merge the unknown call with an IVR or live security agent located in a call center 409b. The security agent 410b may identify himself/herself to the caller and subscriber, place the subscriber on hold, or place one or both parties on hold 411b, and initiate a query regarding the nature of the call 410b. The security agent 410b may use current and past data collected by the system about the caller and call, viewable on a computer screen dashboard (not shown), to further inform the security agent's safe or unsafe call determination process 412b. In the event the security agent 410b determines the call is "safe" 413b, the security agent may unmerge from the call and withdraw from the examination, stop the fraud-call monitoring 414b, and update the system database 405b with additional and possibly new "safe call" data that can further inform the fraud-call monitoring process on subsequent calls.

Alternatively, in the event the security agent 410b determines the call is "unsafe" 415b, the security agent 410b may terminate the call 416b, play a cancellation message to the caller and send out notifications to third parties and the subscriber 417b, and stop the monitoring process 418b. The system may update the database 405b with additional and possibly new "unsafe call" data that can further inform the fraud-call monitoring process on subsequent calls. In the event the security agent 410b cannot ascertain whether the call is safe or unsafe 419b, the security agent may discuss the matter with the subscriber while placing the caller on hold, continue the fraud-call monitoring while letting the call to proceed 420b, and update the database. It should be understood that the conversation analysis process can be configured to screen all inbound calls to a subscriber of the monitoring system and all outbound calls from a subscriber to known and unknown telephone numbers and parties.

Figure 4C:
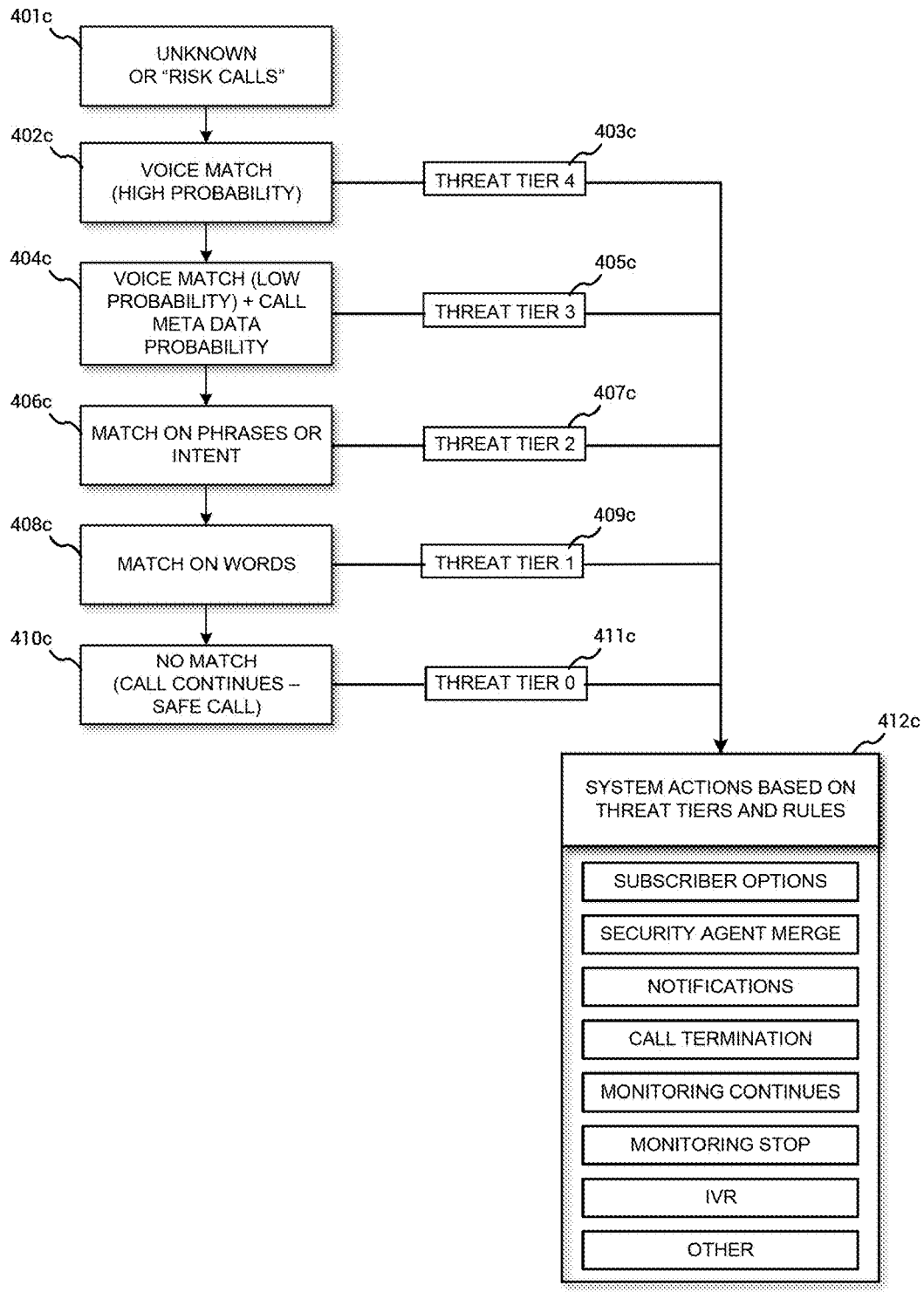
FIG. 4C is a flow diagram of an illustrative process used by a telephone fraud-call monitoring system to rank unknown calls based on threat level tiers and to assign system responses corresponding to threat levels.

With regard to FIG. 4C, a flow diagram of an illustrative process 400C (from FIG. 4, detail 408), for a telephone fraud-call monitoring system to generate and rank in real time the threat level of conversations between an unknown caller, or party, and a subscriber of the monitoring system is shown. The process may receive calls classified as "unknown" or "risk-calls" 401c, as previously described. The monitoring system may use an AI engine and neural network, the cognition system, to assess and compute the probabilities and indexing of fraud-call threats from an unknown caller or party. The cognition system may utilize automatic speech recognition technology, word and phrase identification technologies, language understanding which may include analysis of caller intent and sentiment technology, voice biometric identification, IVR capability, facial recognition technology (for video calls), and other such tools and technologies, as is known in the art, that may be incorporated into the cognition system to aid in recognizing a potential fraud attempt and stopping a fraud caller, or party, in real time during a conversation with a protected subscriber.

In one embodiment, a caller's voice biometric data may be stored in the monitoring system database, the cognition system may compare the caller's voice biometric data to the database. In the event of a high probability match to a caller's or party's voice 402c with a known fraudster in the database, the cognition system, based on rules, may rank the call as "Threat Tier 4," 403c, and terminate the call along with other actions 412c, as shown. In another embodiment, the voice match may be associated with a known safe caller in the monitoring system database (not shown). In such event, the unknown call or party may be reclassified as a safe call, wherein the process described in FIG. 4B may be implemented. In the event the cognition system cannot compute a sufficient probability of a voice match with a known fraudster in the database, whereby the voice match probability is low, yet there may be a relatively high probability of a match with other call data 404c, such as metadata, intent and sentiment data and the like, associated with a known fraudster, or fraudsters, in the database, the cognition system, based on rules, may rank the call as "Threat Tier 3," 405c, and terminate the call along with other actions 412c, as shown. In another embodiment, the low voice and high call data match 404c may be associated with a known safe caller in the monitoring system database (not shown). In such event, the unknown call may be reclassified as a safe call, wherein the process described in FIG. 4B may be implemented. In the event of a high probability match to a caller's use of a phrase or phrases 406c that have been identified by the cognition system and stored in the database, to convey a dangerous meaning or a caller's conversation intent is computed such that there is a sufficient probability of intention to defraud, the system may rank the call as "Threat Tier 2" 407c. and terminate the call along with other actions 412c, as shown. In the event the cognition system cannot compute sufficient probability for phrase or intent match, yet there may be a sufficient probability of a match with spoken words 408c during the party's conversation associated with a known fraudster words in the database, the cognition system, based on rules, may rank the call as "Threat Tier 1" 409c, and terminate the call along with other actions 412c, as shown. In the event of low probability for matches 410c associated with Threat Tiers 1 through 4, the cognition system, based on rules, may rank the call a "Threat Tier 0" 411c. In such event, the unknown call may be reclassified as a safe call, wherein the process described in FIG. 4B may be implemented.

Figure 5:
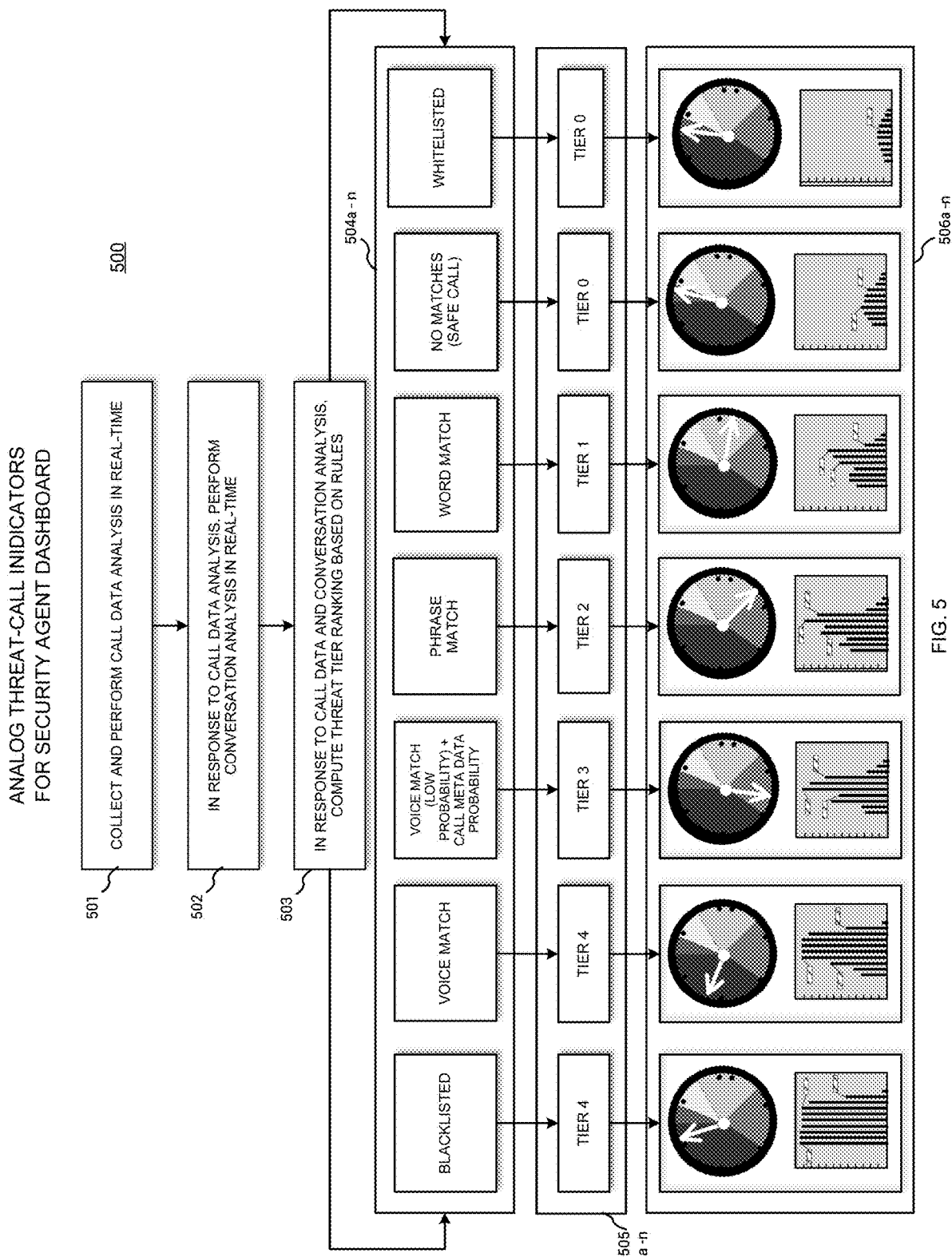
FIG. 5 is an illustration of an analog visualization of tiered fraud-call threat levels based on various data, speech and words associated with a safe and unsafe telephone calls.

With regard to FIG. 5, a flow diagram of an illustrative multi-step process 500 for a telephone fraud-call monitoring system to generate in real time analog ranking indexes and charts with notations to aid security agent disposition of a potential fraud call is shown. The process 500 may receive telephone calls into a monitoring gateway, or data center, from the PSTN telephone (fixed-line) and wireless carrier networks and VoIP/SIP data networks (not shown). At step 501, the process 500 may collect and analyze call data of the caller or called party, in real time. In response to step 501, the system may initiate step 502, whereby conversation and facial recognition analyses and any other useful call analyses may be performed on the call. Upon completion or during steps 501 and 502, the monitoring system, based on rules, may rank at step 503 the call by threat, step 504a-n, and assign threat tiers 505a-n, as shown. In response to the ranking at step 503, the monitoring system may process the call analyses into analog representations, step 506a-n. In such event and pursuant to the ranking, the monitoring system may merge a security agent into an ongoing conversation between an unknown call or party and a protected subscriber. The security agent may utilize a computer screen (FIG. 19) to review the unknown call's data which may include threat tier ranking and key fraud-related indicators including words or phrases used by either party, functionality to listen to selectable bad-call call segments, and other information presented in analog and digital forms. In an embodiment, the monitoring system may automatically tag or otherwise identify one or more audio segments in association with transcribed speech that includes speech that may be indicative of a fraud being perpetrated. Rather than the security agent reviewing computational outputs which may require time to assess and understand, the monitoring system may present to the security agent processed analog representations outputs step 506a-n, along with key notations, as shown, which may provide the basis for improved security agent judgment accuracy and threat determination timing including ending the call, and greater levels of efficiency of security agent and call center resources. In an alternate embodiment, the analog presentation may include data associated with the protected subscriber, such as responses to unknown party's demands or questions, words and phrases associated with a fraud call, voice identification and speech stress levels, age, contact information, subscriber account, and other such data and information that may be useful in the security agent's disposition of a potential fraud call and assistance to the subscriber.

Figure 6:
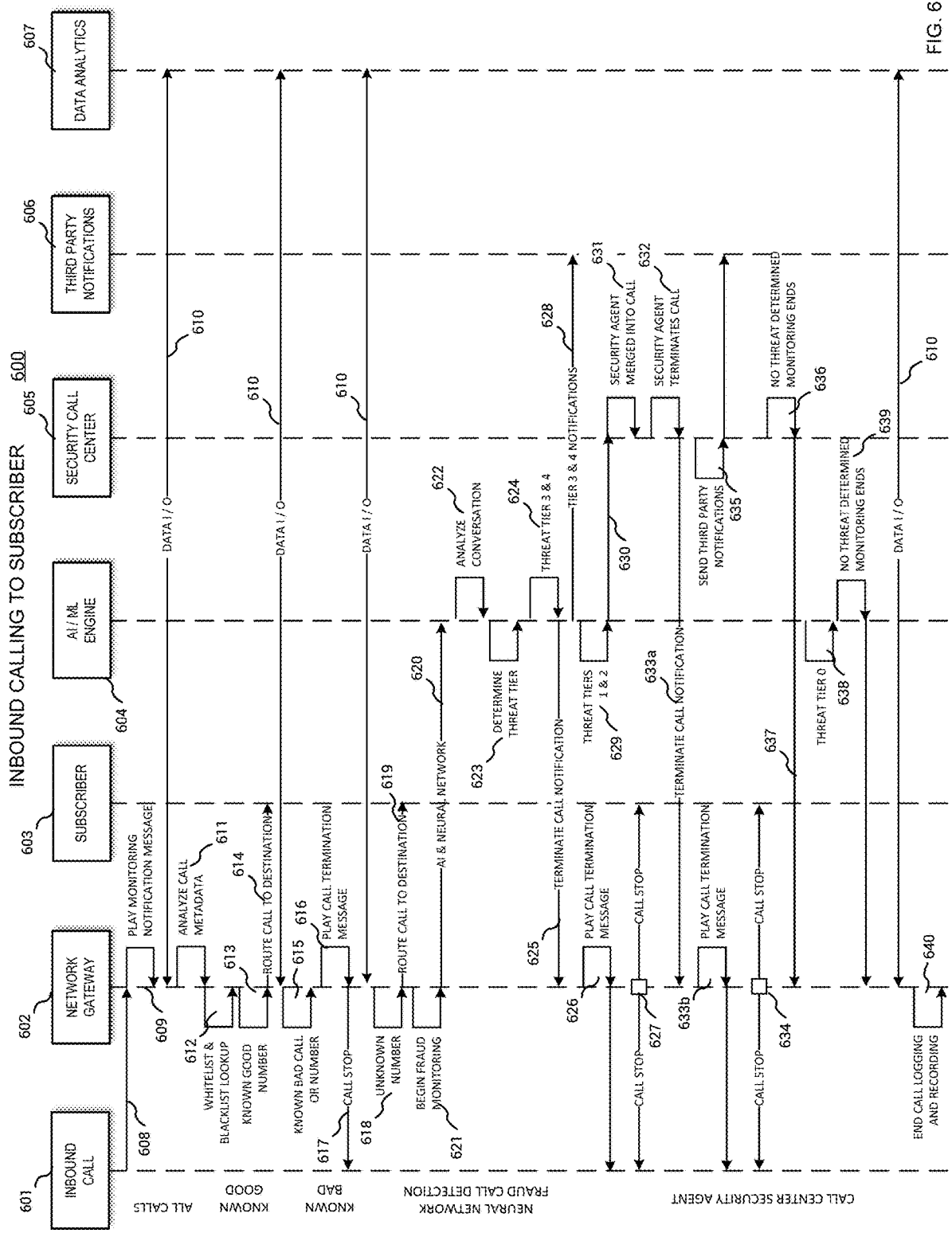
FIG. 6 is an illustration of an interactive flow diagram showing data flows and operations performed on inbound calls to a subscriber of the telephone fraud-call monitoring system.

With regard to FIG. 6, an illustration of an interactive flow diagram 600 showing voice and data communication flows and operations performed on inbound calls as an illustrative process that may comprise a telephone fraud management system. The data communications flows and operations may include; an inbound call 601, a proxy server/network gateway 602, a subscriber to the monitoring system 603, an AI or machine learning engine server 604, a security call center 605, a third-party notifications server 606, and data analytics servers 607. In the instant example, a caller 601 may initiate an inbound call 608 to a subscriber 603. The inbound call 608 may be directed to the monitoring system network gateway 602 by PSTN telephone (fixed-line), wireless carrier networks and VoIP/SIP data networks (not shown). Upon receiving the inbound call 608, the network gateway 602 may play a monitoring message or audible tone to the caller 609, signifying the called party's telephone is monitored by the fraud-call monitoring system. Alternatively, the network gateway 602 may place the call 608 into a conference bridge controlled by a conference management engine, not shown and, thereafter, play a monitoring message or audible tone to the caller 609. The network gateway 602 may communicate 610 with the data analytics servers 607 to update or retrieve information and data that may further improve the speed and accuracy of the monitoring system.

In order to further scrutinize the inbound call 608 for safety, the network gateway 602 may analyze the call's metadata 611 and perform a whitelist and blacklist lookup 612. In the event the inbound call 608 is determined to be a known good number 613, for example, the inbound call 608 may be routed 614 by the network gateway 602 (or the conference management engine, not shown) to the subscriber 603. In the event of the call 608 being placed into a conference bridge, the conference management engine may place an outbound call 614 from the conference bridge to the subscriber 603 to connect the inbound call 608 with the subscriber 603. The network gateway 602 may communicate 610 with the data analytics servers 607 to update or retrieve information and data that may further improve the speed and accuracy of the monitoring system.

In the event the inbound call 608 is determined to be a known bad call or number 615, the network gateway 602 may play a call termination message to the caller 616 and thereafter terminate the call 617. In the event of the call 608 being placed into a conference bridge, the conference management engine may communicate instructions to the network gateway 602 to effectuate playing a termination message 616 and terminating the call 617. The network gateway 602 may communicate 610 with the data analytics servers 607 to update or retrieve information and data that may further improve the speed and accuracy of the monitoring system.

In the event the inbound call 608 is determined to be an unknown number 618, the inbound call 608 may be routed 619 by the network gateway 602 to the subscriber 603. Upon routing the inbound call to its destination, the monitoring system may open a call leg or otherwise communicate with the AI engine 604 to begin fraud call conversation monitoring 621. The monitoring system may perform in real-time a multi-step scrutinizing analysis of the conversation 622, which may include, automatic speech recognition, voice biometric identification, sentiment and intent analyses, facial recognition (for video calls), for example, in order to ascertain the safety of the call. It should be understood that the system may monitor, individually, sequentially or simultaneously, one or both parties, so context of the conversation may be monitored for intent or other purposes, thereby helping to improve fraud detection. In another embodiment, the conference management engine may selectively open a call leg from the conference bridge to the AI engine 604 to facilitate the AI and neural network scrutiny 620 of the inbound call at 608 (not shown).

Based on rules, the AI engine 604 and neural network conversation monitoring 620 may analyze 622 and rank 623, by threat level or tier, the conversation of the caller 601 and subscriber 603, separately or in concert with one another. In the event a high threat tier determination or ranking 624, such as of 3 or 4, (as describe in FIGS. 4C and 5) is assigned to the conversation, the AI/ML engine 604 may communicate a "terminate call" notification 625 to the network gateway 602. The network gateway 602 may thereafter play a call termination message to the caller 626 and terminate or stop the call 627. The AI/ML engine servers 604 may communicate a call cancellation notification to the subscriber 603 (not shown) and any third parties 606 sanctioned by the subscriber 603 to receive such notices. In another embodiment, the AI/ML engine 604 may communicate the terminate call notification 625 to the conference management engine, whereby instructions to play the call termination message 626 and terminate or stop the call 627 may be communicated to the network gateway 602.

Alternatively, in the event of a lower threat tier determination or ranking 629, such as 1 or 2 (as describe in FIGS. 4C and 5), is assigned to the conversation, the AI/ML engine 604 may communicate 630 to the network gateway 602, or conference management engine if a conference bridge is in use (not shown), instructions to open a call leg to the security call center 605, whereby a security agent 631 may be merged with the call in-progress, or added to the conference bridge. The security agent 631 may introduce himself or herself to the call parties, place the subscriber 603 on hold and, thereafter, interrogate the unknown caller 601. In the event the security agent 603 determines the call is fraudulent, the agent may instruct the network gateway 602 or a conference management engine (not shown) to terminate 632 the call 608 or close the call leg in the event of a conference bridge environment. The termination notification may be communicated by the security call center servers 605 to the network gateway 602 or conference management engine (not shown). The network gateway 602 may thereafter play a call termination message 633a to the caller and terminate the inbound call leg 634b. After terminating the inbound call, the security agent 631 may rejoin the call leg 614 with the on-hold subscriber 603 to inform the subscriber 603 regarding the disposition of the inbound call 608. The security call center 605 may communicate call cancellation notifications 635 to the subscriber and any third parties 606 sanctioned by the subscriber 603 to receive such notices 635.

In the event the security agent 631 determines there is no threat associated with call 608 and the call is a good call 636, the security call center may communicate instructions 637 to network gateway 602 or conference management engine (not shown), to turn off or terminate the call leg 620 to the AI/ML engine 604 and cease monitoring the in-progress call.

In the event of a "0" threat tier determination or ranking 638 (as describe in FIGS. 4C and 5) by the AI engine 604 is assigned to the conversation. The AI engine 604 may communicate instructions to network gateway 602 or conference management engine (not shown) to turn off or terminate the call leg 620 to the AI/ML engine 604 and cease monitoring the in-progress call 639. The network gateway 602 may communicate 610 with the data analytics servers 607 to update or retrieve information and data that may further improve the speed and accuracy of the monitoring system. The network gateway 602, or conference management engine, may end call logging and recording 640.

It should be understood that the AI/ML engine may monitor a call until a determination is made that a potential threat of fraud exists or no threat is determined. In response to determining a threat based on any number of rules, a threat level may be determined and appropriate action(s) may be taken, as further described herein. It should be understood that the process may be linear or non-linear as a determined fraud threat may cause the process to automatically skip to perform a process, such as a call interdiction.

Figure 7:
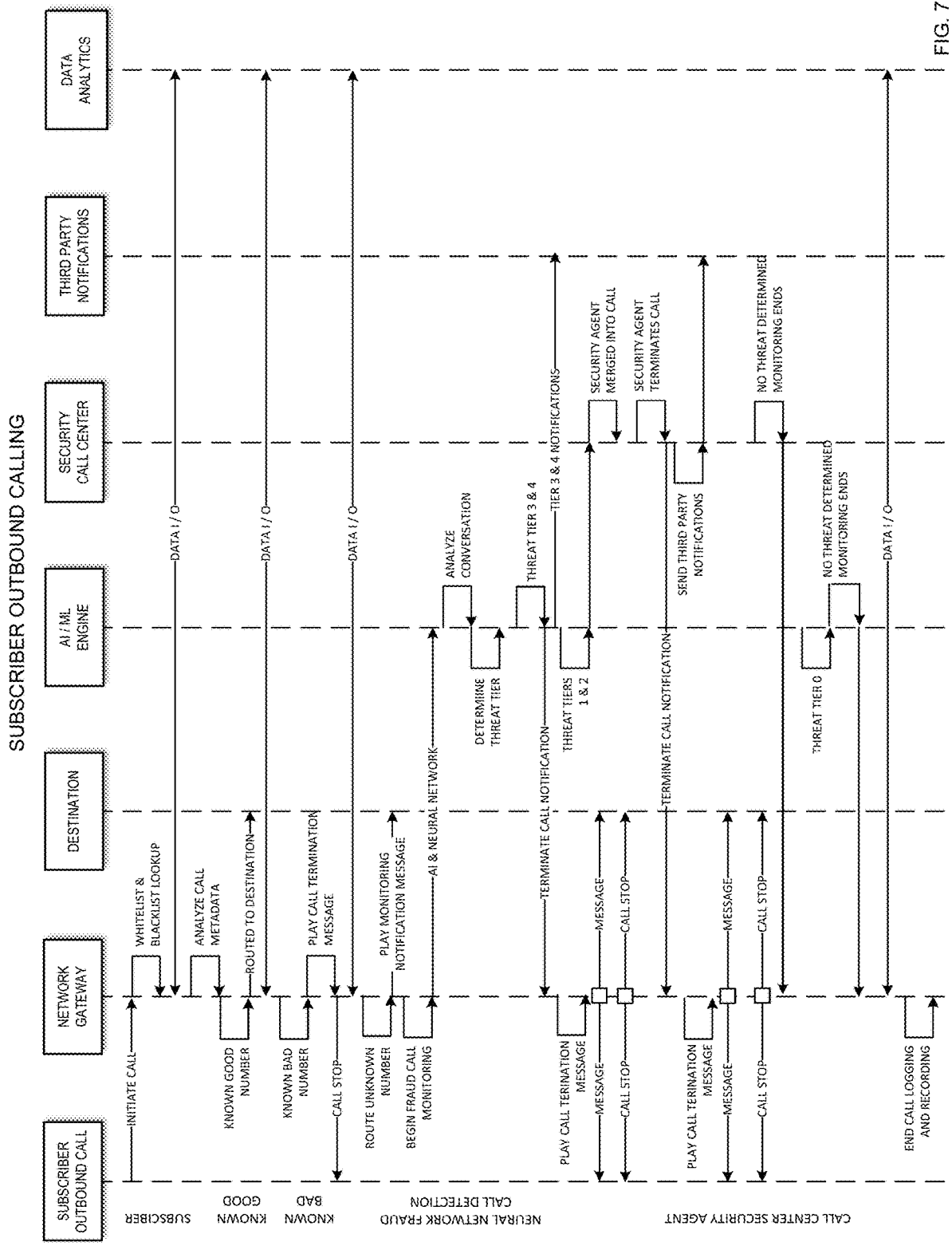
FIG. 7 is an illustration of an interactive flow diagram showing data flows and operations performed on outbound calls from a subscriber of the telephone fraud-call monitoring system.

With regard to FIG. 7, an illustration of an interactive flow diagram 700 showing voice and data communications flows and operations performed on outbound calls from a subscriber as an illustrative process that may comprise a telephone fraud management system is shown. The process may be analogous to the process of FIG. 6, as previously described. It should be understood that the processes of FIGS. 6 and 7 may alternatively be combined.

Figure 8:
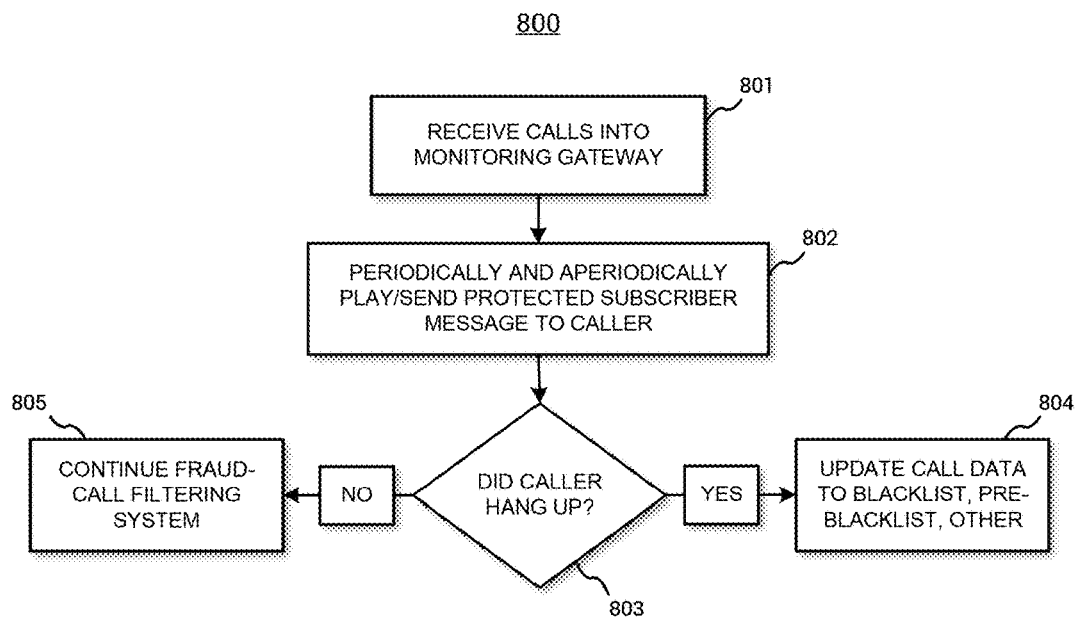
FIG. 8 is a flow diagram of an illustrative process used by a telephone fraud-call monitoring system to notify a caller to a subscriber of the fraud-call monitoring system that the call is being monitored by system.

With regard to FIG. 8, a flow diagram of an illustrative process 800 for reducing call load through a fraud-call monitoring system is shown. At step 801, the process 800 may receive telephone calls into a monitoring gateway, or data center, from the PSTN telephone network (fixed-line), wireless carrier networks, and/or VoIP/SIP data networks. In general, the monitoring system may perform a multi-step scrutinizing analysis of the call, which may include a whitelist and backlist lookup, metadata analysis, automatic speech recognition, voice biometric identification, sentiment and intent analyses, IVR and security agent querying caller, facial recognition (for video calls), for example, in order to ascertain the safety of the call. It should be understood that the system may monitor one or both parties (i.e., calling party and called party), and the system may monitor a combination of both parties so context of the conversation may be monitored for intent or other purposes, thereby helping to improve fraud detection.

More specifically, at step 802, the monitoring system, based on rules, may play one or more notification or warning messages and/or tone(s) to the calling and/or called party (i.e., the party not being protected by the monitoring system) indicating the call is being monitored by the fraud-call monitoring system in an embodiment. That is, the notification message may only be audible to the unknown caller or party, or may be audible to both parties. At step 802, the message may be played before the call connection is completed or after the completion of the call while a conversation is in progress. When performing step 802, it may be determined at step 803 that the unknown caller or party hangs up upon hearing the message and/or tone(s), the monitoring system at step 804 may update data of the caller in one or more databases with an additional and possibly new "unsafe caller." The database(s) may include, for example, pre-blacklist-whitelist or blacklist-whitelist lookup databases, metadata databases, and voice recognition databases, that can further inform the fraud-call monitoring process on subsequent calls by the caller. Alternatively, when performing step 802, it may be determined that the unknown caller or party does not hang up upon hearing the message and/or tone(s), at step 803, and in such event, the fraud-call monitoring system may continue the call monitoring process at step 805 to ascertain the safety of the call.

As the determination at step 803 is made that the caller and other callers hung up, the blacklist or pre-blacklist call database(s) may grow sufficiently to filter-out greater and greater quantities of fraud-calls at the earliest stages of the monitoring process, thereby reducing the load on system resources and increase system efficiency over time. In another embodiment, the monitoring system may automatically accumulate hang-up call data for a subscriber. The hang-up call data may be assembled into a blacklist or pre-blacklist database unique to a particular subscriber, thereby reducing or eliminating the need of a subscriber submitting a personal blacklist to the monitoring system. The hang-up call database, which may have unsafe call data stored therein, may be accessed for the same or different subscriber, especially if the unsafe call data are identified as being associated with a bad call. By enabling unsafe call data to expand beyond an individual party being protected by the fraud-call monitoring system, other subscribers being protected by the fraud-call monitoring system may benefit from the system determining that the calling or called party is a potential fraudster, thereby improving protection to subscribers of the system.

Figure 9:
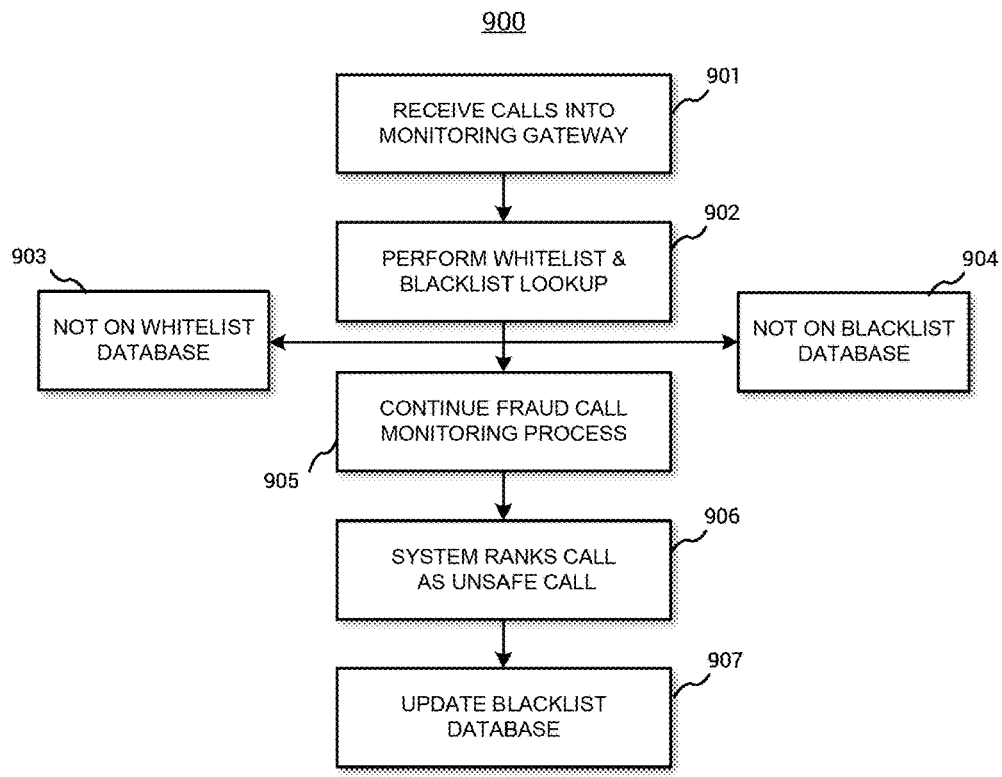
FIG. 9 is a flow diagram of an illustrative process used by a telephone fraud-call monitoring system to automate blacklist database development in order to improve the efficiency of the monitoring system and relieve the subscriber of providing a personal blacklist.

With regard to FIG. 9, a flow diagram of an illustrative process 900 for automating the establishment and growth of a call verification blacklist database and reducing call load through a fraud-call monitoring system is shown. At step 901, the process 900 may receive telephone calls into a monitoring gateway, or data center, from the PSTN telephone (fixed-line), wireless carrier networks, and/or VoIP/SIP data networks. The monitoring system may perform a multi-step scrutinizing analysis of the call, which may include a whitelist and blacklist lookup at step 902, and include metadata analysis, automatic speech recognition, voice biometric identification, sentiment and intent analyses, IVR and security agent querying caller, facial recognition (for video calls), for example, in order to determine the safety of the call. The whitelist and blacklist lookups may alternatively be performed in separate steps. Moreover, the other processes (e.g., metadata analyses, etc.) may be performed in different steps from step 902, and each of those processes may be performed in the same or different steps. In one embodiment, the call may be filtered through a whitelist and blacklist lookup engine when performing step 902, whereby the call is determined to not be listed on either the whitelist at step 903 or backlist at step 904. In such event, the fraud-call monitoring system may continue the call monitoring process at step 905, as described hereinabove, to ascertain safety of the call.

The monitoring system, based on rules, may rank the call as an "unsafe" call at step 906. In such event and pursuant to the ranking, the monitoring system may update the blacklist database at step 907 and other databases with additional and possibly new "unsafe" call data that may include for example, a telephone number, metadata, speech and voice recognition data, etc., that can further inform the fraud-call monitoring process on subsequent calls. As the determination at step 906 is made that the caller is ranked as unsafe, the blacklist database may be updated at step 907. As the caller and other callers are determined to be unsafe, the blacklist database may grow sufficiently to cause more and more quantities of unsafe calls to stopped at the initial call lookup processes, thereby reducing the load on system, thereby increasing system efficiency over time. Moreover, the monitoring system may automatically accumulate unsafe call data for a subscriber to update the blacklist database at step 907. The safe call data may be assembled into the whitelist database unique to a particular subscriber 1002, thereby reducing or eliminating the need of a subscriber to submit a personal whitelist to the monitoring system. It should be understood that the unsafe call data for each subscriber may be included in a local, regional, national, or global database to enable the data to be used to analyze call data for some or all of the subscribers. In other words, whitelist and/or blacklist data may be collected and applied to one or more databases that may be applied when analyzing calls being made to other subscribers, thereby improving safety for some or all subscribers of the system while reducing load on the system as the unsafe calls may be reduced across the subscribers.

Figure 10:
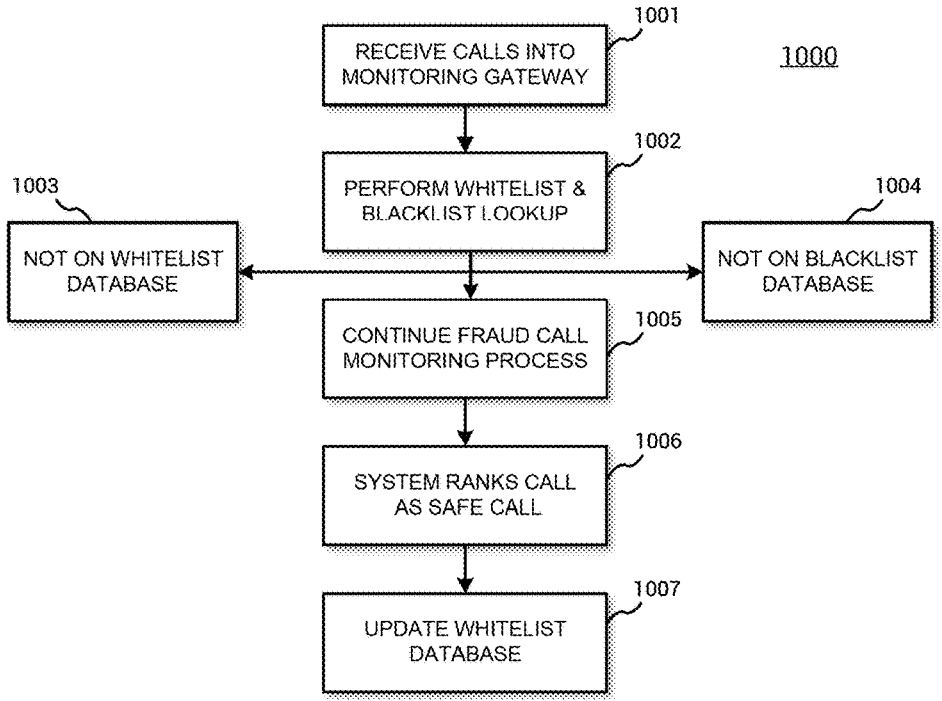
FIG. 10 is a flow diagram of an illustrative process used by a telephone fraud-call monitoring system to automate whitelist database development in order to improve the efficiency of the monitoring system and relieve the subscriber of providing a personal whitelist.

With regard to FIG. 10, a flow diagram of an illustrative process 1000 for automating the establishment and growth of a call verification whitelist database and reducing call load through a fraud-call monitoring system is shown. At step 1001, the process 1000 may receive telephone calls into a monitoring gateway, or data center, from the PSTN telephone network (fixed-line), wireless carrier networks, and VoIP/SIP data networks. The monitoring system may perform a multi-step scrutinizing analysis of the call, which may include a whitelist and blacklist lookup at step 1002, and include performing a metadata analysis, automatic speech recognition, voice biometric identification, other biometric identification, sentiment and intent analyses, IVR and security agent querying caller, facial recognition (for video calls), for example, in order to ascertain the safety of the call. As previously described, the process of step 1002 may be separated into multiple steps. In one embodiment, the call may be filtered through a whitelist and blacklist lookup engine when performing step 1002, whereby the call is determined to not be listed on either the whitelist at step 1003 or backlist at step 1004. In such event, the fraud-call monitoring system may continue the call monitoring process at step 1005, as described hereinabove, to ascertain the safety of the call.

The monitoring system, based on rules, may rank the call as a "safe" call at step 1006. In such event and pursuant to the ranking, the monitoring system may update the whitelist database at step 1007 and other databases with additional and possibly new "safe" call data that may include for example, a telephone number, metadata, speech and voice recognition data, etc., that can further inform the fraud-call monitoring process on subsequent calls. As the determination at step 1006 is made that the caller may be ranked as safe, the whitelist database may be updated at step 1007, which may cause the whitelist database to grow sufficiently to permit greater and greater quantities of safe calls to proceed at the initial call lookup processes, thereby reducing the load on system and increase system efficiency over time. The monitoring system may automatically accumulate safe call data for a subscriber to update the whitelist database at step 1007. The safe call data may be assembled into the whitelist database unique to a particular subscriber 1002, thereby reducing or eliminating the need of a subscriber to submit a personal whitelist to the monitoring system. It should be understood that the safe call data for each subscriber may be included in a local, regional, national, or global database to enable the data to be used to analyze call data for some or all of the subscribers. In other words, whitelist and/or blacklist data may be collected and applied to one or more databases that may be applied when analyzing calls being made to other subscribers.

Figure 11:
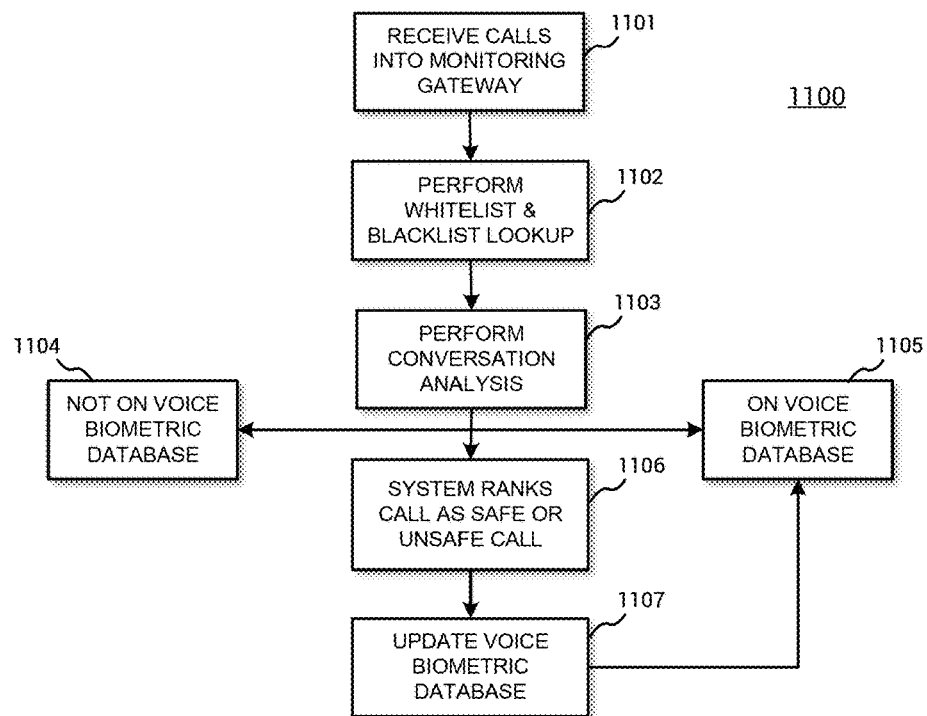
FIG. 11 is a flow diagram of an illustrative process used by a telephone fraud-call monitoring system to automate voice identification database development in order to improve the efficiency of the monitoring system.

With regard to FIG. 11, a flow diagram of an illustrative process 1100 for automating the establishment and growth of a voice identification call verification database and reducing call load through a fraud-call monitoring system is shown. At step 1101, the process 1100 may receive telephone calls into a monitoring gateway, or data center, from the PSTN telephone network (fixed-line), wireless carrier networks, and VoIP/SIP data networks. The monitoring system may perform a multi-step scrutinizing analysis of the inbound or outbound call, which may include a whitelist and blacklist lookup at step 1102, and include performing a metadata analysis of the inbound or outbound call number in order to ascertain safety of the call. In one embodiment, the call may be filtered through a conversation analysis engine at step 1103 utilizing one or more call verification and authentication processes, such as voice biometric identification technology, and associated voice identification technology (e.g., voice fingerprinting using spectral or other analyses) as is known in the art. At step 1103, the conversation analysis engine may determine whether the caller or called party is a voice biometric not stored on the system database at step 1104 or stored on the system database at step 1105.

The monitoring system, based on rules, may rank the call as a "safe" or "unsafe" call at step 1106. In such event and pursuant to the ranking, the monitoring system may update a voice biometric identification database for safe and unsafe calls step at 1107, which may be inclusive of whitelist and blacklist databases in order to further inform the fraud-call monitoring process on subsequent calls. As the determination at step 1106 is made that the caller or called party is ranked as safe or unsafe, the voice identification database may be updated at step 1107, and the unknown party is determined to be safe or unsafe, thereby causing the voice biometric database to grow sufficiently to permit greater and greater quantities of safe calls to proceed and unsafe calls to be stopped at the initial call lookup processes. As the whitelist and blacklist databases grow, the load on system resources may decrease and system efficiency may be increased over time. In addition, the monitoring system may automatically accumulate safe and unsafe voice identification data for a subscriber to update the voice biometric database at step 1107. The voice identification data may be assembled into a voice identification whitelist and blacklist database unique to a particular subscriber, thereby reducing or eliminating the need of a subscriber to submit a personal voice identification whitelist or blacklist to the monitoring system. It should be understood that the safe call voice biometric data for each subscriber may be included in a local, regional, national, or global database to enable the data to be used to analyze call data for some or all of the subscribers. The voice biometrics database, which may have voice biometrics stored therein, may be accessed for the same or different subscriber especially if the voice biometrics are identified as being associated with a bad or unsafe call. In other words, voice identification data may be collected and applied to one or more databases that may be applied when analyzing calls being made to other subscribers, as previously described.

Figure 12:
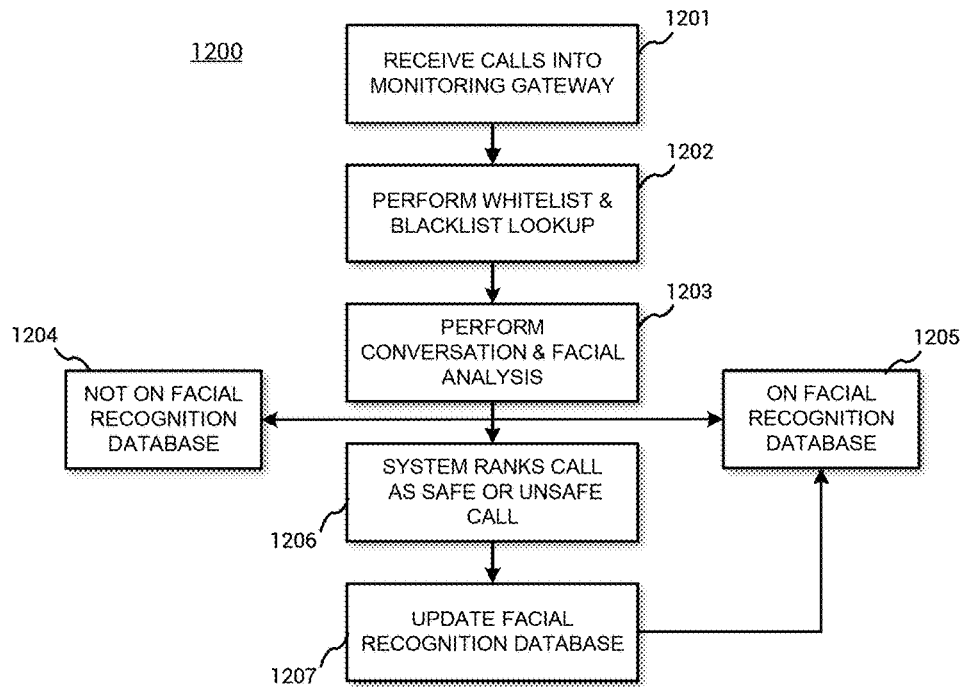
FIG. 12 is a flow diagram of an illustrative process used by a telephone fraud-call monitoring system to automate facial recognition database development in order to improve the efficiency of the monitoring system.

With regard to FIG. 12, a flow diagram of an illustrative process 1200 for automating the establishment and growth of a facial recognition identification database and reducing call load through a fraud-call monitoring system is shown. At step 1201, the process 1200 may receive video calls into a monitoring gateway, or data center, from the PSTN telephone (fixed-line) and wireless carrier networks and VoIP/SIP data networks. The monitoring system may perform a multi-step scrutinizing analysis of the call, which may include a whitelist and blacklist lookup at step 1202 in order to determine the safety of the call. The video call may be filtered through a facial recognition analysis engine at step 1203, whereby the caller or called party is determined not listed at step 1204 or listed at step 1205 on the facial recognition database. It should be understood that other biometric engines (e.g., fingerprint, voiceprint, etc.) may be utilized independent of or in combination with the facial recognition analysis engine in determining the safety of the call.

The monitoring system, based on rules inclusive of the facial recognition data, may rank the call as a "safe" or "unsafe" call at step 1206. In such event and pursuant to the ranking, the monitoring system may update the facial recognition identification database for safe and unsafe calls at step 1207, which may be inclusive of whitelist and blacklist databases in order to further inform the fraud-call monitoring process on subsequent calls. As the determination at step 1206 is made that the caller or called party is safe, the facial recognition whitelist and blacklist database at step 1207 may grow sufficiently to permit greater and greater quantities of (i) safe calls to proceed and (ii) unsafe calls to be stopped at the initial call lookup processes step 1202, thereby reducing the load on system resources and increase system efficiency over time. In an embodiment, the monitoring system may automatically accumulate facial recognition data for a subscriber to update the whitelist and blacklist database at step 1207. The facial recognition and safe call data may be assembled into a facial recognition whitelist database unique to a particular subscriber 1202, thereby reducing or eliminating the need of a subscriber to submit a personal facial recognition whitelist to the monitoring system. The facial recognition database, which may have facial recognition indicators stored therein, may be accessed for the same or a different subscriber, especially if the facial recognition indicators are identified as being associated with a bad or unsafe call. It should be understood that the facial recognition call data 1207 for each subscriber may be included in a local, regional, national, or global database to enable the data to be used to analyze call data for some or all of the subscribers. In other words, facial recognition data may be collected and applied to one or more databases that may be applied when analyzing calls being made to other subscribers so as to potentially screen unsafe calls from the other subscribers and reduce system load accordingly.

Figure 13:
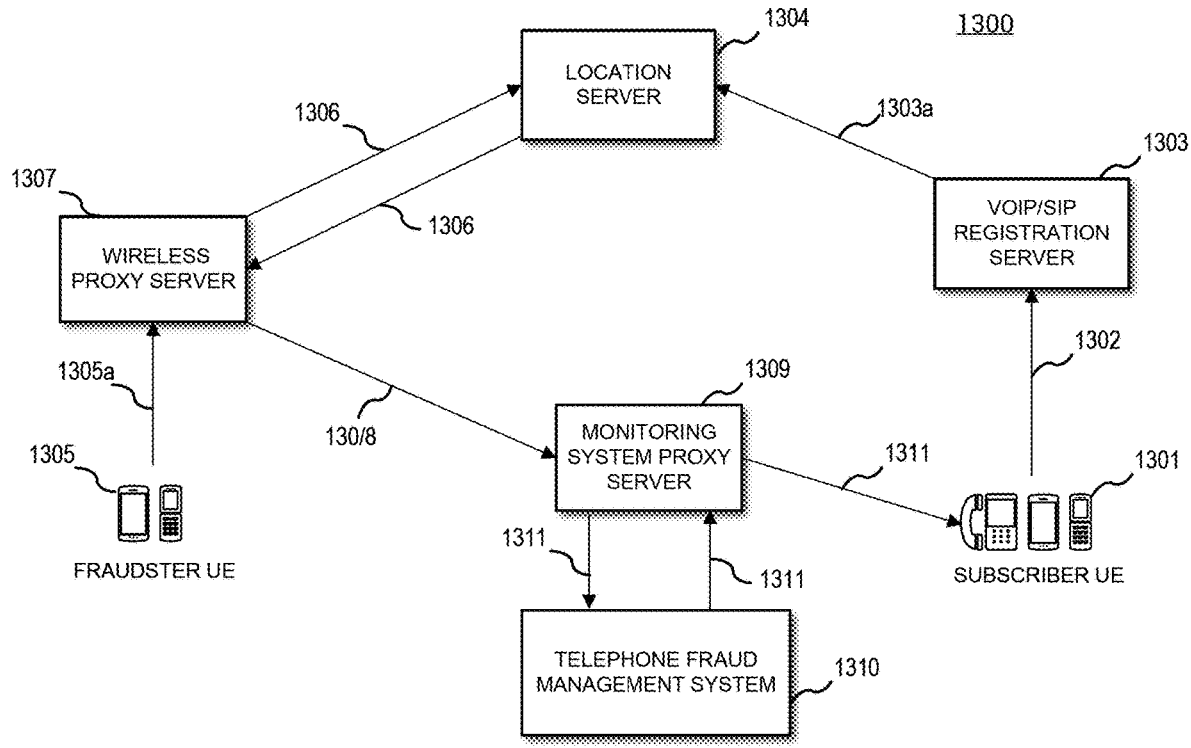
FIG. 13 is an illustration of an illustrative environment in which a telephone fraud monitoring system may route inbound wireless calls to a subscriber through a telephone fraud management system.

With regard to FIG. 13, an illustration of an illustrative environment where a telephone fraud-call monitoring system may operate in order to route inbound calls to a subscriber of the monitoring system is shown. The subscriber user equipment (UE) 1301 may be located on a data network, such as a VoIP or SIP IP telephony network. The subscriber may initiate the process by connecting the UE 1301 to the broadband network, or data network, usually a LAN (not shown). After the subscriber's UE 1301 is connected to a data network, the UE communicates 1302 with a registration server 1303 in order to register the UE's IP address to a selected data-based telephony network, wherein voice and video calling packets may be prioritized on the data network for call clarity and quality, as is understood in the art. The subscriber UE 1301 may be pre-provisioned by the equipment supplier to communicate with a unique registration server 1303 located on the data network, or, alternatively, the subscriber UE 1301 may be pre-provisioned to communicate with the UE supplier or monitoring network (not shown), wherein the supplier or monitoring network may direct the registration process of the subscriber user equipment 1301 to the registration server 1303.

Once the registration server 1303 communication 1302 has been established with the subscriber UE 1301 and the UE IP address registered, the subscriber UE 1301 location on the data network may be communicated 1303*a* to a location server 1304 on the selected data network. The fraudster UE 1305 may initiate a call 1305*a* to the subscriber, wherein the call 1305*a* may be routed through a wireless proxy server 1307 associated with the telephony network assigned to the outbound call of the fraudster's UE 1305. The wireless proxy server 1307 may communicate 1306 with a location server 1304 in order to establish instructions for call routing 1308 of the fraudster's call to the subscriber UE 1301. The location server 1304 may instruct the wireless proxy server 1307 to route the fraudster's call to the monitoring system proxy server 1309. Once communication has been established between the wireless proxy server 1307 and the monitoring system proxy server 1309, the call and call processing may be completed and initiated between the subscriber UE 1301 and the telephone fraud management system 1310 as a sequential or simultaneous event via the data network 1311. The fraudster UE 1305 call to the subscriber UE 1301 may now be processed through the fraud call monitoring system, as previously described. It should be understood that various switching may occur between the wireless network and the data network in order to effectuate the completion of the call, as is known in the art. It should also be understood, the present diagram and architecture is representative, and, as such, the system and processes can similarly be applied to inbound and outbound calling using PSTN (fixed-line), VoIP, and/or SIP networks.

Figure 14:
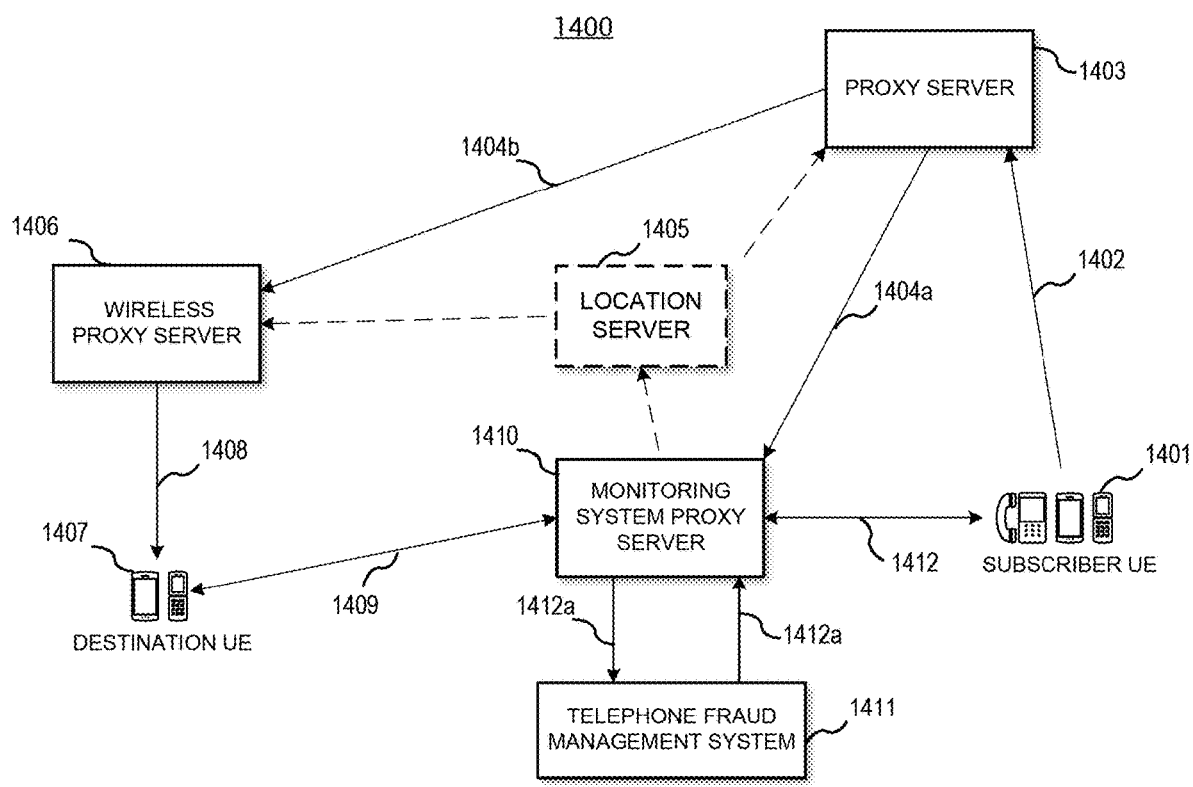
FIG. 14 is an illustration of an illustrative environment in which a telephone fraud monitoring system may route outbound calls from a subscriber through a telephone fraud management system.

With regard to FIG. 14, an illustration of an illustrative environment, where a telephone fraud-call monitoring system may operate in order to route outbound calls from a subscriber of the monitoring system to a destination located on a wireless network, is shown. The subscriber user equipment 1401 may be located on a data network, such as VoIP or SIP IP telephony network. The subscriber UE 1401 initiates the process by making an outbound call 1402 to a destination which may be a telephone fraudster's UE 1407 located on a wireless network. The outbound call may be registered to and communicate 1402 with a proxy server 1403 located on the data network. To facilitate call routing through the monitoring system proxy server 1410, the proxy server 1403 may communicate with a location server 1405 in order to determine the location of the destination UE 1407 on the wireless network and the location of the monitoring system proxy server 1410 on the data network. The proxy server 1403 may thereafter communicate outbound call connection instructions 1404a to the monitoring system proxy server 1410 and inbound call connection instructions 1404b to the wireless proxy server 1406 and outbound call destination UE via 1408 route.

Once call routing connection instructions have been established between the subscriber UE 1401 and the destination UE 1407, the call may be completed sequentially or simultaneously via routes 1412 and 1409 to the monitoring system proxy server 1410, where the call may now be processed through the fraud call management system 1411 using data communications 1412. It should be understood that various switching may occur between the wireless network and the data network in order to effectuate the completion of the call, as is known in the art. It should also be understood that the present diagram and architecture are representative and, as such, the system for monitoring and interdicting calls may be similarly applied to inbound and outbound calling using PSTN (fixed-line), VoIP, and SIP networks.

Figure 15:
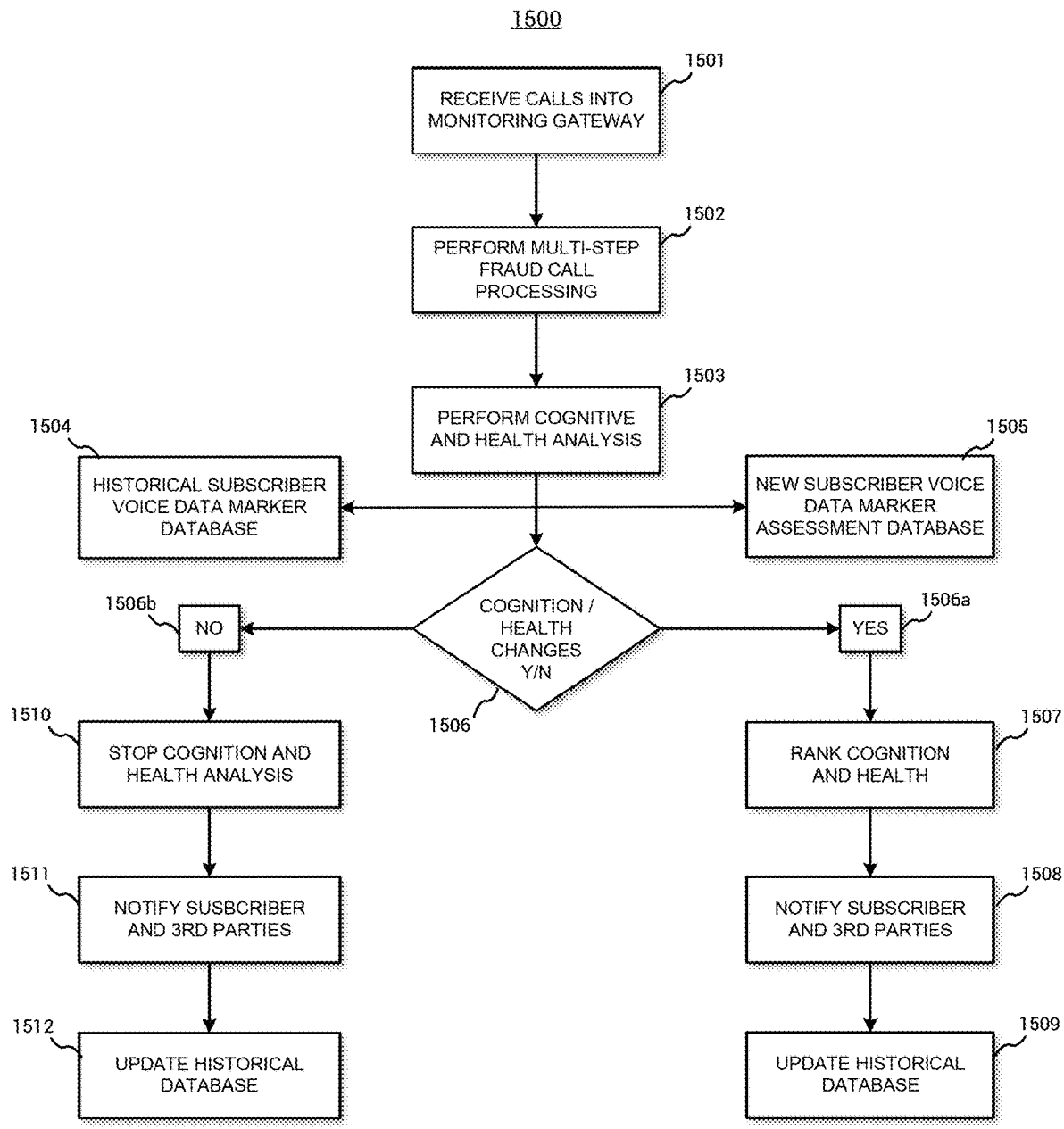
FIG. 15 is a flow diagram of an illustrative process used by a telephone fraud-call monitoring system to automate cognitive and health-related databases in order to evaluate subscribers' cognitive decline or health problems.

With regard to FIG. 15, a flow diagram of an illustrative process 1500 for (i) automating the establishment and growth of a subscriber cognitive and health-related analysis databases and (ii) identifying cognitive and health decline using a fraud-call monitoring system is shown. The process 1500 may start at step 1501 by receiving telephone calls into a monitoring gateway, or data center, from the PSTN telephone network (fixed-line), wireless carrier networks, and VoIP/SIP data networks, as is known in the art. In an embodiment, the calls may be from a fraudster calling a protected subscriber of the fraud-call monitoring system, or, alternatively, the call may be from a protected subscriber unsuspectingly calling a telephone number of a potential scam artist. In either case, the monitoring system may perform a multi-step call scrutinizing analysis of the inbound or outbound calls, including conversation analysis which may include recording the conversation of both parties, in order to ascertain the safety of a call at step 1502. In one embodiment, the conversation may be filtered, in real time or off-line mode, through a cognitive and health conversation analysis engine at step 1503.

Using the cognition system of the monitoring system previously described, the cognitive and health conversation analysis engine at step 1503 may compare a subscriber's speech and any relevant components of speech, facial recognition indicators, and any verbal interactions with third parties including performing standardized testing for cognitive or health decline with a historical database record at step 1504 of the subscriber's speech and facial indicators and responses or, in the event of a new subscriber, establish a new cognitive health database at step 1505 as a baseline for future analysis or make assessments at step 1503 regarding subscriber cognitive health with new baseline data. At step 1506, in the event the cognition system determines there may be changes at step 1506a between the subscriber's historical record, performed at step 1504, for indicators related to cognitive decline or health, the monitoring system, based on rules, may rank the results of the subscriber's cognitive and health analysis or examination at step 1507, notify the subscriber and any third parties sanctioned by the subscriber should such ranking occur at step 1508, and update the subscriber's historical record at step 1509 for future reference.

In the event the cognition system determines there may not be changes at step 1506b between the subscriber's historical record for indicators related to cognitive decline or health, the monitoring system, based on rules, may stop the cognition and health assessment process at step 1510, notify the subscriber and any third parties sanctioned by the subscriber should such ranking occur at step 1511, and update the subscriber's historical record at step 1512 for future reference. It should be understood, the processes may be used both within and without a fraud-call monitoring system, where an historical record of an individual's speech and facial recognition indicators may be developed and compared for cognitive decline and health related analytical purposes.

Figure 16A:
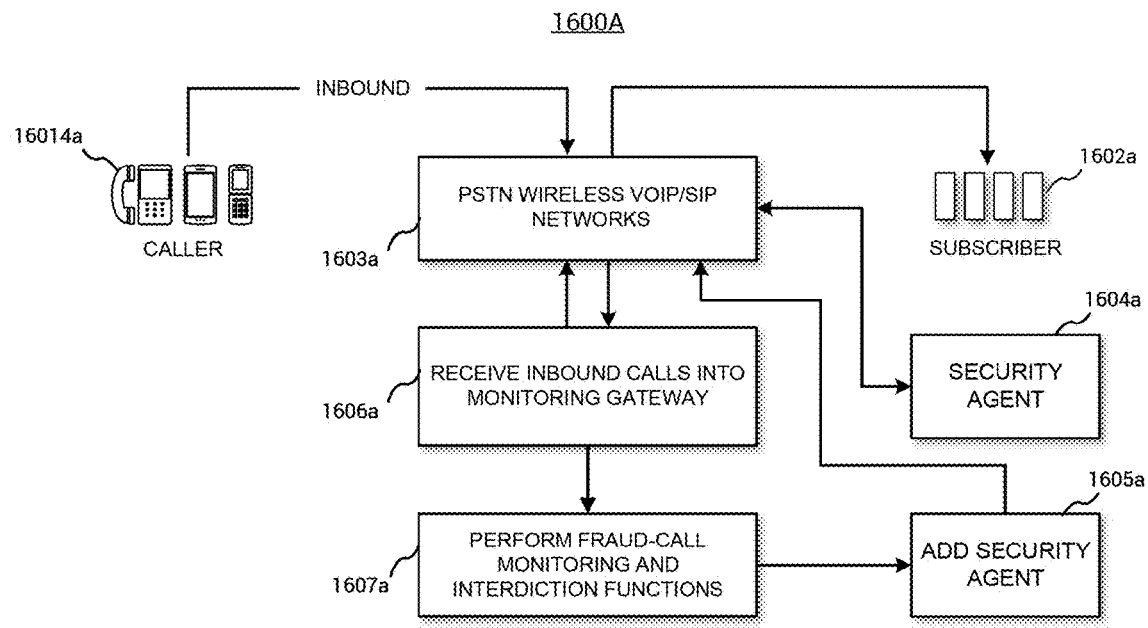
FIG. 16A is a flow diagram of an illustrative process for real-time, autonomous monitoring of inbound calls to a subscriber of the monitoring system.

With regard to FIG. 16A, a flow diagram of an illustrative process 1600A for real-time, autonomous monitoring of inbound calls to a subscriber of the monitoring system is shown. It should be understood that unlike typical call center-based systems, the subscriber may not engage the monitoring system or contact the phone center and security agent to effectuate the monitoring of inbound calls. However, the monitoring system may contact the subscriber and caller, as previously described. The process may begin with a caller 1601a initiating a call to the subscriber 1602a. The call may be routed through the various telephony and data networks 1603a. The inbound call to the subscriber may automatically be routed to the monitoring system gateway 1606a. The monitoring system 1606a may autonomously operate a conference bridge, whereby the inbound call is placed into the conference bridge as the monitoring system initiates an outbound call from the conference bridge to the subscriber 1602a, thereby automatically joining the inbound call to with the outbound call to the subscriber within the conference bridge. From the conference bridge operated by the monitoring gateway 1606a, a conference management engine, as described with regard to FIG. 18, may add services to the conference bridge (i) to perform fraud-call monitoring and interdictions services 1607a as a third-party entering the inbound call prior to the call-connection process and (ii) to monitor a call until a determination is made that a potential threat of fraud exists or no threat is determined.

Figure 16B:
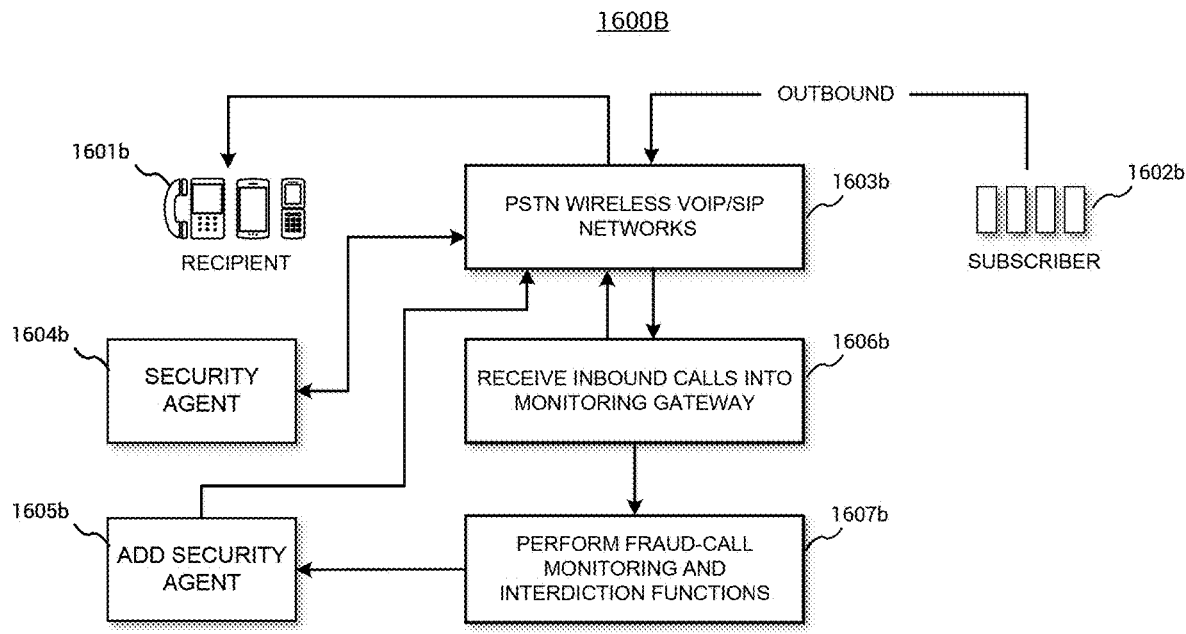
FIG. 16B is a flow diagram of an illustrative process for real-time, autonomous monitoring of outbound calls from a subscriber of the monitoring system.

With regard to FIG. 16B, a flow diagram of an illustrative process 1600B for real-time, autonomous monitoring of outbound calls from subscriber of the monitoring system to a call recipient is shown. It should be understood that unlike typical call center-based systems, the subscriber may not engage the monitoring system or contact the phone center and security agent to effectuate the monitoring of inbound calls. However, the monitoring system may contact the subscriber and called party, as previously described. The process begins with the subscriber 1602b initiating an outbound call to the recipient 1601b. The call may be routed through the various telephony and data networks 1603b to the monitoring system proxy server/gateway 1606b. The proxy server/gateway 1606*b* may autonomously operate a conference bridge, whereby the outbound call may be automatically placed into the conference bridge as the proxy server/gateway 1606*b* initiates a call from the conference bridge to the call recipient 1601*b*, therefore, joining the call recipient with the outbound call of the subscriber within the conference bridge. From the conference bridge operated by the monitoring gateway 1606*b*, a conference management engine, as described in FIG. 18, may add services to the conference bridge, such as perform fraud-call monitoring and interdictions services step 1607*b* and add a security agent to the call in-progress step 1605*b*. In another embodiment, the proxy server/gateway 1606*b* may instruct the telephone carrier networks and data networks 1603*b* to add a security agent 1604*b*. In such event, the security agent 1604*b* may be added as a call leg into a conference bridge in progress with the caller and called parties, or the security agent call leg may added to the in-progress call without using a conference bridge, as is known in the art. It should also be understood, the present diagram and process is representative and, as such, the invention can similarly be applied to inbound and outbound calling using PSTN (fixed-line) and VoIP and SIP networks.

Figure 17:
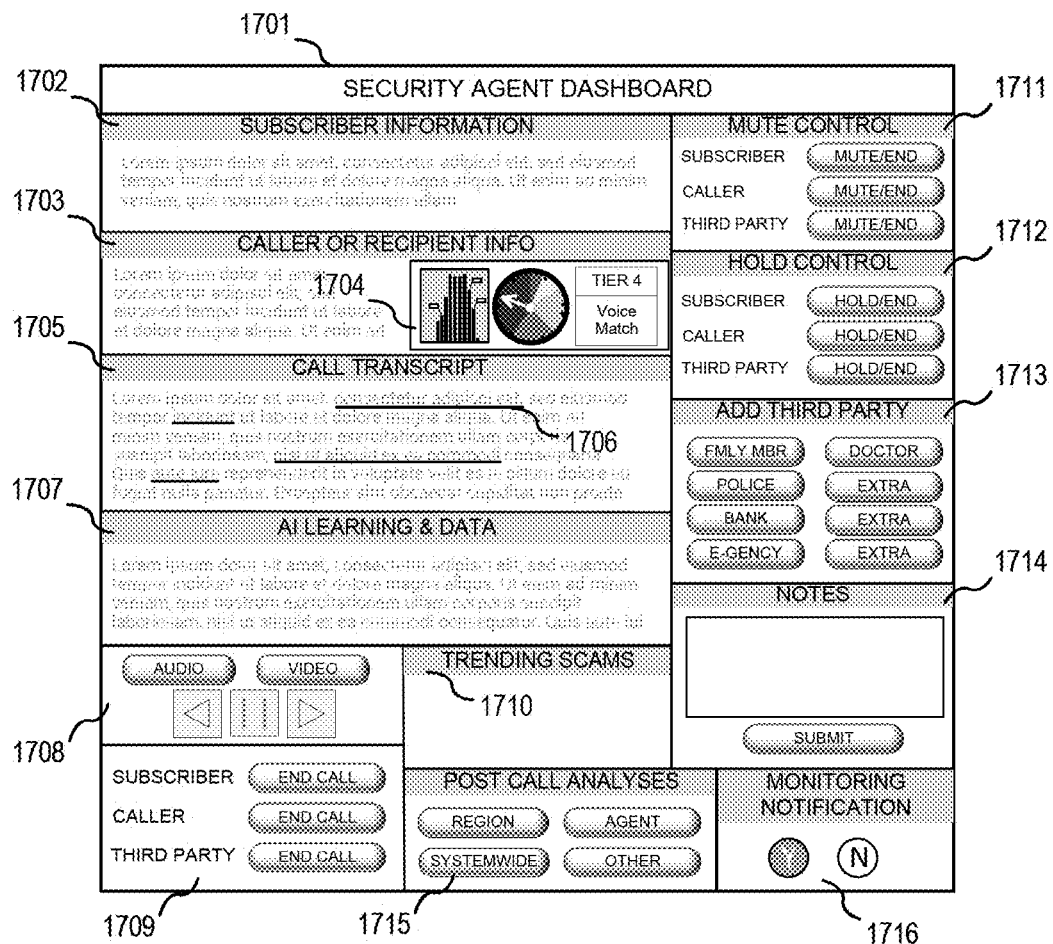
FIG. 17 is a screen shot of an illustrative user interface dashboard that may be used by a security agent of a telephone fraud management system provider to enable the security agent to monitor and manage a telephone call between a subscriber and another caller (e.g., non-subscriber)

With regard to FIG. 17, a screen shot of an illustrative user interface dashboard 1700 that may be used by a security agent of a telephone fraud management system provider is shown. The dashboard 1701 may include information and tools for controlling the call party legs located at the conference bridge host server and monitoring system proxy server/gateway. The features of the dashboard shown may be configured to provide:

(1) an interactive viewable area for subscriber information 1702. This area may include, for example, name, address, date of enrollment, telephone number, current service plan, trusted third parties, third party telephone numbers, banking information, social security number, level of cognitive capabilities, age, gender, history (e.g., previously scammed), etc., and permit updating of the information by the security agent. Section 1702 may provide the security agent a working understanding of the protected subscriber and relevant connections should a need arise;

(2) an interactive viewable area 1703 for calling party, or recipient of subscriber's outbound call, information may be displayed. Area 1703 may include, telephone number, name, whitelist or blacklist data, call metadata, voice biometric identification match level, network type (e.g., PSTN, mobile, etc.), service provider, and selectable graphical information 1704 that may utilize AI analyses to dynamically indicate the level of safety and threat indicators of the call, amongst other possible outputs of the AI analyses;

(3) an interactive viewable area 1705 where a call transcript of the conversation in progress between the parties may be displayed and an AI threat detection engine may dynamically identify and optionally highlight 1706 (in any format) any potentially unsafe or threat words and/or phrases spoken or responded to by either party of the conversation. In an embodiment, a full transcription of the call (along with real-time updates to the call transcript) may be captured and displayed, but the display may automatically actually display only portions of the transcript that include the highlighted words identified by the AI threat detection engine and hide with selectable features to unhide transcription text outside of the highlighted portion, where the hidden portions of the text may be based on context, time, distance, or any other AI determined or non-AI determined parameter. By hiding portions of the text that may be less relevant to the words determined to potentially be a threat, the security agent may be able to more quickly assess the threat, while still being able to access any additional context in which the potential threat was made. The AI threat detection engine may assess the conversation of both parties to ensure subscriber responses to possible oblique statements and questions do not lead to an unsafe call and provide interactive graphical information about the call;

(4) an interactive viewable area 1707 for artificial intelligence notices, threat words and phrases, potential threat level determined by the AI, data, security agent inputs and the like may be displayed. In this area 1707, a security agent may review the AI threat detection learning activities and add suggestions that may be incorporated into the AL learning algorithms to further improve AI accuracy and allow for the potential of real-time improvement of the AI threat detection engine to address new threats as new threats appear;

(5) an interactive viewable area 1708 may be displayed, whereby the security agent may selectably listen to the current or previous conversation audio file or view a video file if the subscriber uses a video phone or smartphone;

(6) an interactive viewable area 1709 may be displayed, whereby the security agent may selectably end a call of any of the various call parties or legs currently connected to a conference bridge;

(7) an interactive viewable area 1710 may be displayed, whereby the security agent may view information and results of call center operations regarding trending fraud scams and fraudsters. The security agent may also input information about new scams being encountered;

(8) a viewable interactive area 1711 may be displayed, whereby the security agent may selectably mute one or more of the call parties;

(9) a viewable interactive area 1712 may be displayed, whereby the security agent may selectably place on hold or remove a hold function of one or more call parties;

(10) an interactive viewable area 1713 may be seen, whereby the security agent may selectably add third parties to the call in-progress, for example, the security agent may ascertain that a fraud-caller may have access to a subscriber's bank account number. In the instant situation, the security agent may select the bank button to open a call leg to the subscriber's bank from information that may be included in the subscriber information section 1702;

(11) an interactive viewable area 1714, where the security agent may enter notes, contemporaneously or post facto, about a monitored call,

(12) an interactive viewable area 1715 may be seen, where the security agent may access post-call analysis and projective data concerning a current call or generalized security agent interventions analyses; and

(13) an interactive viewable area 1716 may be displayed, whereby a lighted indicator or soft-button may inform the security agent whether or not the system has delivered an audible message or a sound to the caller, or call recipient if from an outbound call is initiated from a subscriber, thereby indicating that the call recipient is actively being protected by the telephone fraud management system 1310.

It should be understood that the dashboard 1701 may enable the security agent to open each of the areas 1702-1715 into separate windows. If so, the information, such as call transcript, may be expanded so that the security agent may be able to view additional amounts of information. For other areas, such as the subscriber info area 1702, additional information about the subscriber may be displayed. The information about the subscriber is generally limited to information that would be relevant to assist the security agent determine whether or not the subscriber is being subjected to a fraud call. For example, the subscriber information may provide a list of banks in which the subscriber has bank accounts, last four digits of each bank account number, names of relatives (e.g., husband, wife, children, number of children, parents, maiden name, middle name, etc.), where the information may be submitted by the subscriber, primary care person (e.g., adult children, residence, facility in which the subscriber resides, etc.) so that the security agent may assess any possible disclosure of information to a would-be fraudster that may be detrimental to the subscriber by reviewing the call transcript, for example.

In an embodiment, the call transcript area 1705 may include soft-buttons or hyperlink text that enable the security agent, quality assurance team member, supervisor, or otherwise to review the transcript and approved or disapprove of the call transcript and/or highlighting performed by the AI engine. If approved or disapproved, that information may be used for further training of the AI engine so as to improve accuracy of the AI engine. It is likely that the AI engine will have more training in the beginning of operation than over time as the AI engine dynamically learns from actual operations. Moreover, as different telephone fraud tactics (e.g., different words or phrases) are utilized, the training of the AI engine may be continuously adapting to new threats in a dynamic manner. New threats may additionally be assigned new threat levels that currently exist or added in response to the new threats. After the call is completed, a quality assurance team or supervisor may be presented with the same or different dataset as presented on the dashboard 1701 and ultimately submitted as a completed call report. In an embodiment, it may be determined that the call party or called party (if called by a subscriber) should be added to a white list, and a supervisor may submit that call or called party to a white list. In an alternative embodiment, information associated with the call party or called party (if called by a subscriber) may be communicated to or made available to a subscriber or representative to confirm that the call or called party is to be added to the white list. Similarly, if the call or called party is determined to be added to a black list, then the supervisor may submit or confirm that the designated party is to be added to the black list and/or a subscriber or representative may confirm that addition. Still yet, an automated system that uses artificial intelligence or otherwise may be utilized to perform post-call analysis and, optionally, provide an assessment to a supervisor or quality assurance person.

Call Management for Fraud Monitoring

Figure 18:
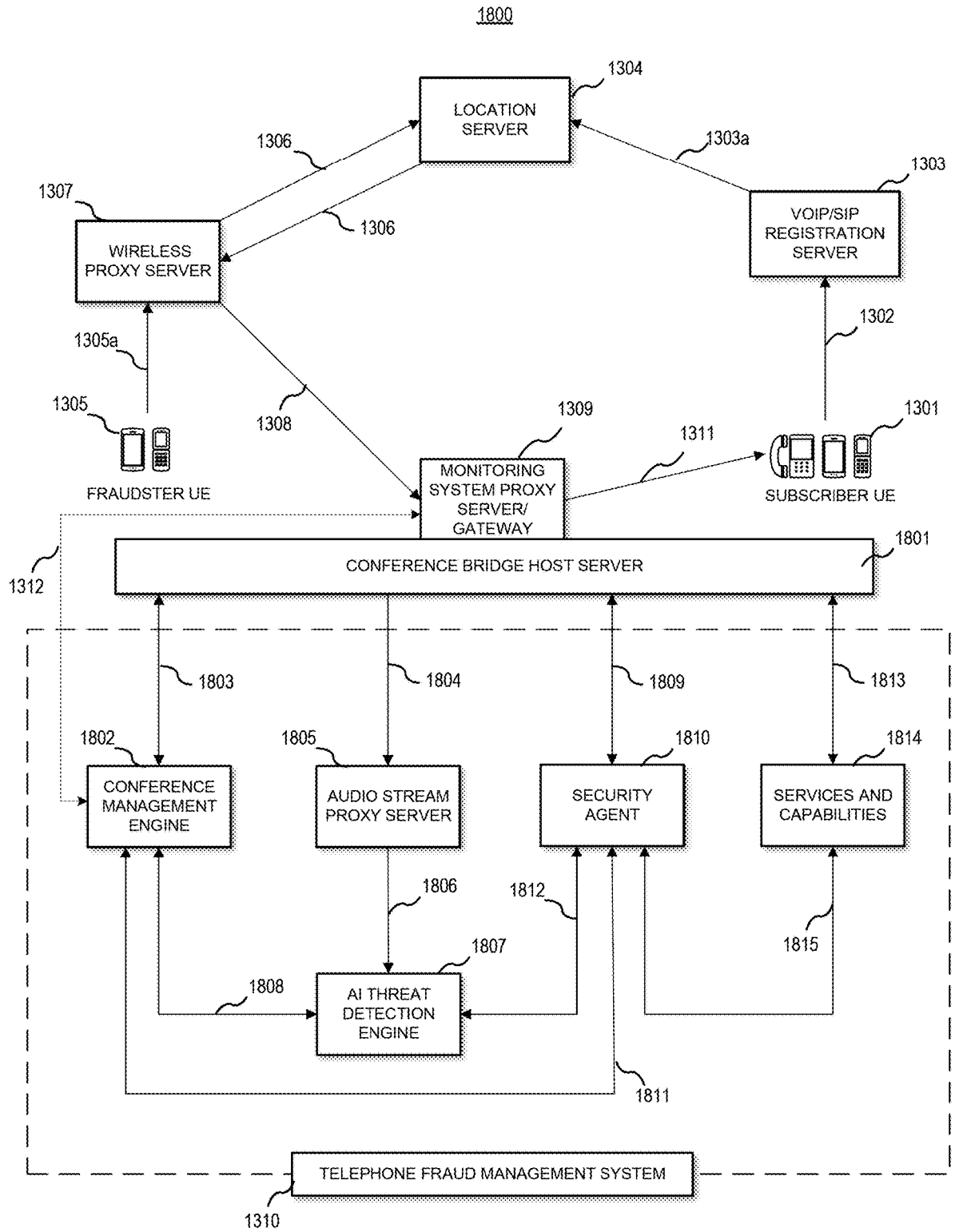
FIG. 18 is a block diagram of an illustrative network environment in which a fraud call may be established and monitored for fraud detection using a conference bridge.

To further describe the implementation, the architecture of FIG. 13 is expanded in FIG. 18 to include execution details for setting up and monitoring potential fraud calls within the telephone fraud management system 1310. As shown, the telephone fraud management system 1310 is shown to be expanded to include a number of architectural components, including both hardware and software 1800, as further described hereinbelow.

In order to scrutinize the safety of an inbound call to a subscriber of the telephone fraud-call monitoring and interdiction network, the inbound call 1308 may be directed to a monitoring system proxy server/gateway 1309. Upon receiving the inbound call 1308, the monitoring system proxy server/gateway 1309 may communicate instructions 1312 with conference management engine 1802, whereby the instructions 1312 from the conference management engine 1802 may instruct the monitoring system proxy server/gateway 1309 to (i) cause a conference bridge host server 1801, either directly or indirectly, to open a conference bridge, and (ii) attach or communicatively connect the inbound call or inbound call leg 1308 to the conference bridge being managed by the conference bridge host server 1801. Thereafter, the conference management engine 1802 may communicate additional instructions 1312 to the monitoring system proxy server/gateway 1309 to setup, sequentially or simultaneously, outbound call legs 1804 and 1311 to the audio stream proxy server 1805 and subscriber 1301, respectively, and attach or communicatively connect the outbound call legs 1804 and 1311 (i.e., cause communications signals to flow from each of the call legs 1804 and 1311 to a network bridge) to the conference bridge being managed by the conference bridge host server 1801. Consequently, the inbound caller 1305 and the subscriber 1301 each are connected to the conference bridge such that the inbound caller 1305 and subscriber 1301 are able to communicate with one another.

For the purposes of this description, a call leg may be considered a communications connection between two points (e.g., telephones, servers, conference bridge, etc.) on a communications network of any common or disparate type(s). Also, although not shown, a call announcement or message (e.g., "this call is being monitored by SeniorSafe") that may include verbal and/or audible content, as previously described hereinabove, may be made to the inbound caller 1305 prior to being added to the conference bridge or while in the conference bridge, but prior to being connected with the subscriber 1301. It should be understood that if the subscriber 1301 calls a called party, that the call announcement may still be played to the non-subscriber, in this case the called party.

Because the conference bridge allows for more than two parties (i.e., calling party and called party), the outbound call leg 1804 enables an audio stream of the communications of the inbound caller 1305 and subscriber 1301 to be communicated to an audio stream server 1805. Again, the outbound call leg 1804 may be established simultaneously or sequentially relative to placing one or both of the inbound caller 1305 and subscriber 1301 into the conference bridge. As is further described hereinbelow, by establishing a conference bridge for the inbound caller 1305 and subscriber 1301 to initially be connected, various call treatments and interventions by a security agent, may be automatically applied by the system in a seamless manner. It should be understood that the use of a conference bridge between a calling party (in this case the inbound caller 1305) and a called party (in this case the subscriber 1301) is atypical for how a conference bridge is generally operated as normally two parties are provided a link or telephone number to call or connect into the conference bridge, or a party is placed into a conference bridge by a called or call party. For example, in the case of a call center communications system, a customer is transferred into a conference bridge and customer service representatives call into the conference bridge. From the perspective of the inbound caller 1305 and subscriber 1301, unless a security agent intervenes with a call between the inbound caller 1305 and subscriber 1301, the use of a conference bridge is imperceptible to the inbound caller 1305 and subscriber 1301.

With the attachment of call legs 1308, 1804, and 1311, to the conference bridge host server 1801, thereby connecting each party to the conference bridge, the audio stream proxy server 1805 may automatically communicate an audio stream 1806 of the conversation taking place on a conference bridge via the conference bridge host server 1801 with an AI threat detection engine 1807. In an embodiment, the AI threat detection engine 1807 may receive instructions 1808 from the conference management engine 1802, whereby the audio stream 1806 of the conversation between the inbound caller 1305 (e.g., potential fraudster) and the subscriber 1301 may be communicated 1806 to the AI threat detection engine 1807, and thereby processed for various threats, as previously described with regard to FIGS. 4B, 4C, 5, and 6.

The conference management engine 1802, in an embodiment, may be configured to confirm that the outbound call leg 1804 is active (i.e., communications between the conference bridge host server 1801 and the audio stream proxy server 1805 are occurring) and that the AI threat detection engine 1807 is functional before actually connecting the inbound caller 1305 and subscriber 1301 within the conference bridge. In the event that the outbound call leg 1804 is not active, such that the call is not being monitored by AI threat detection engine 1807, the conference bridge host server 1801 and/or conference management engine 1802 may be configured to prevent the call between the subscriber 1301 and inbound caller 1305 from being connected within the conference bridge. By preventing the call from being connected via the conference bridge, the telephone fraud management system 1310 may ensure that the subscriber 1301 is protected from a fraudulent call situation. It should be understood that the outbound call leg 1804 may be configured to be inactive (i.e., the audio stream proxy server 1805 is not communicating with the conference bridge host server 1801) such that calls to or from people or devices included on a white list may occur, but prevent non-white listed callers or devices from being in communication with the subscriber 1301.

In one embodiment, using Automatic Speech Recognition (ASR) technology to convert the conversation of the parties from speech-to-text, as is known in the art, the AI threat detection engine 1807 may monitor the call and dynamically determine and/or compute one of several threat levels. As a function of the determined threat level by the AI threat detection engine 1807, a threat level response may be performed, which may include automatically terminating the inbound call leg 1308 from the conference bridge host server 1801 or adding security agent 1810 to intervene into the ongoing call, as further described hereinbelow.

An intervention by the security agent 1810 may also include placing the subscriber 1301 on hold to enable the security agent 1810, which may be a human, interactive voice response (IVR) system, or combination thereof to communicate with the calling party 1305. When placed on hold, a notice may automatically be played to the subscriber 1301. In an embodiment, rather than placing the subscriber 1301 on hold, the subscriber 1301 may be placed into a mute state, whereby the subscriber 1301 may be able to listen to an interaction between the security agent 1810 and the inbound caller 1305. In another embodiment, the conference bridge host server 1801 may enable the subscriber 1301 to remain in the conference bridge, but prevent communications from the subscriber 1301 to be heard by the inbound caller 1305. Any spoken communications by the subscriber 1301 may be heard by the security agent 1810 or be captured and transcribed by the AI threat detection engine 1807 and displayed to the security agent 1810 on his or her user interface, thereby enabling the subscriber 1301 to potentially provide useful information to the security agent 1810 on a real-time basis when listening to a discussion between the inbound caller 1305 and security agent 1810.

In the event a threat may be detected and a threat level is determined, the AI threat detection engine 1807 may communicate instructions 1808 to the conference management engine 1802, whereby the conference management engine 1802 may communicate instructions 1312 to the monitoring system proxy server/gateway 1309 to open and attach call leg 1809 from the security agent 1810, therefore joining the security agent 1810 with the conference bridge host server 1801 and the call in-progress. In order to determine the safety of the inbound call, the security agent 1810, using a computer dashboard interface that may be configured to control inbound and outbound call leg functions and display inbound caller data and conversation transcript (see, for example, FIG. 20), the security agent 1810 may place the subscriber 1301 on hold and begin an interrogation of the caller 1305.

Using a dashboard, the security agent 1810 may communicate 1811 and 1812 with the conference management engine 1802 and AI threat detection engine 1807, respectively, in order to interface and control the functions of the conference bridge host server 1801 that may include closing or terminating the call leg 1308, or terminating the call via the monitoring system proxy server/gateway 1309 and AI threat detection engine 1807. In an embodiment, if the call leg 1308 is terminated, call leg 1809 may be opened (i.e., communicatively connected via a transfer, call, network connection, or otherwise) so that the security agent 1810 may speak with or otherwise notify the subscriber 1301 with the reason of the call being terminated rather than simply ending the call. Alternatively, a message may be automatically played that provides an explanation for the call termination to the subscriber 1301. The security agent 1810 may determine the need to add additional service and capabilities 1814 to the ongoing call or to interface with third parties, such as police, banking entities, fraud monitoring authorities, emergency services, and the like. In such event, the security agent 1810 may communicate and instruct 1811 using the dashboard interface with the conference management engine 1802 and monitoring system proxy server/ gateway 1309 to open and attach a call leg 1813 with the conference bridge host server 1801, therefore permitting services and capabilities 1814 to join the ongoing call, or alternatively, the security agent 1810 may use dashboard icons and soft-buttons to directly communicate, including using voice communication 1815 with services and capabilities 1814 and related third parties.

In an alternative embodiment, the conference management engine 1802 may communicate 1803 several or all of its instructions, for example: open and close call leg(s), attach call leg(s), etc., to the conference bridge host server 1801, whereby one or several instructions may be communicated (not shown) with the monitoring system proxy server/gateway 1309 in order to effectuate the processes described herein. In another embodiment, the system may be configured to monitor subscriber 1301 making outbound calls via the monitoring system proxy server/gateway 1309 to a known or unknown party. In this reverse calling embodiment (i.e., subscriber 1301 making an outbound call), the telephone fraud-call monitoring and interdiction network may direct the subscriber's outbound call 1311 to the monitoring system proxy server/gateway 1309, located within the fraud call monitoring system 1310, and, as previously described, optionally setup and attach, either simultaneously or sequentially, the subscriber's outbound call leg 1311, the outbound call leg 1308, and audio stream call leg 1804 to the conference bridge host server 1801. In this embodiment, the same or similar call monitoring for potential threats as applied to an inbound call to the subscriber 1301 may be applied to an outbound call by the subscriber 1301.

It should also be understood, the present process diagram and system architecture of FIG. 18 is representative, and, as such, the processes may similarly be applied to inbound and outbound calling using PSTN (fixed-line), wireless, and VoIP/SIP networks.

It should be further understood, the configuration of the monitoring system proxy server/gateway 1309, the conference bridge host server 1801, the conference management engine 1802, and the audio stream server 1805 may be separated into distinct network components, as shown, combined into one or more network components, or additional network components may be added to effectuate the same or similar processes described with regard to FIG. 18 and/or other figures presented herein.

By initially joining the inbound call leg 1308 to the conference bridge host server 1801, and, either simultaneously or sequentially, opening, adding, and/or closing other call legs to the conference bridge host server 1801, such as call leg 1311 to the subscriber 1301, call legs 1804, which may alternatively be a computer network connection, 1809, and/or 1813 to other services that may include an AI threat detection engine 1807, a security agent 1810, and technical systems to control conference bridge host server 1801 call functions, such as placing calls on hold, ending a call, muting a call or terminating a call, the system provides an environment whereby a potential fraud call may be subjected in real-time to several call treatments, data analyses, and caller scrutiny services that may minimize or stop telephone fraud activities.

It should be understood that the present diagram is representational and that various alternative configurations of proxy servers, computing engines, functional activities, networking, switching and communications designs may be developed to effectuate the call fraud prevention system and processes. It should further be understood that alternative hardware and/or software configurations may be utilized to provide for the same or similar functions to effectuate the call prevention system and processes.

Although the focus of the monitoring system is to prevent fraud by establishing a conference bridge in which a calling party and called party may be connected, optionally with an outbound audio stream for call monitoring, generalized call center operations may be simplified and fewer call drops may occur. The reason for reduced call drops may be due to the calling party (or called party) being held within the conference bridge without an inadvertent drop due to a customer service representative inadvertently misrouting the calling party to another customer service representative or manager or other transfer mechanism, for example.

Figure 19:
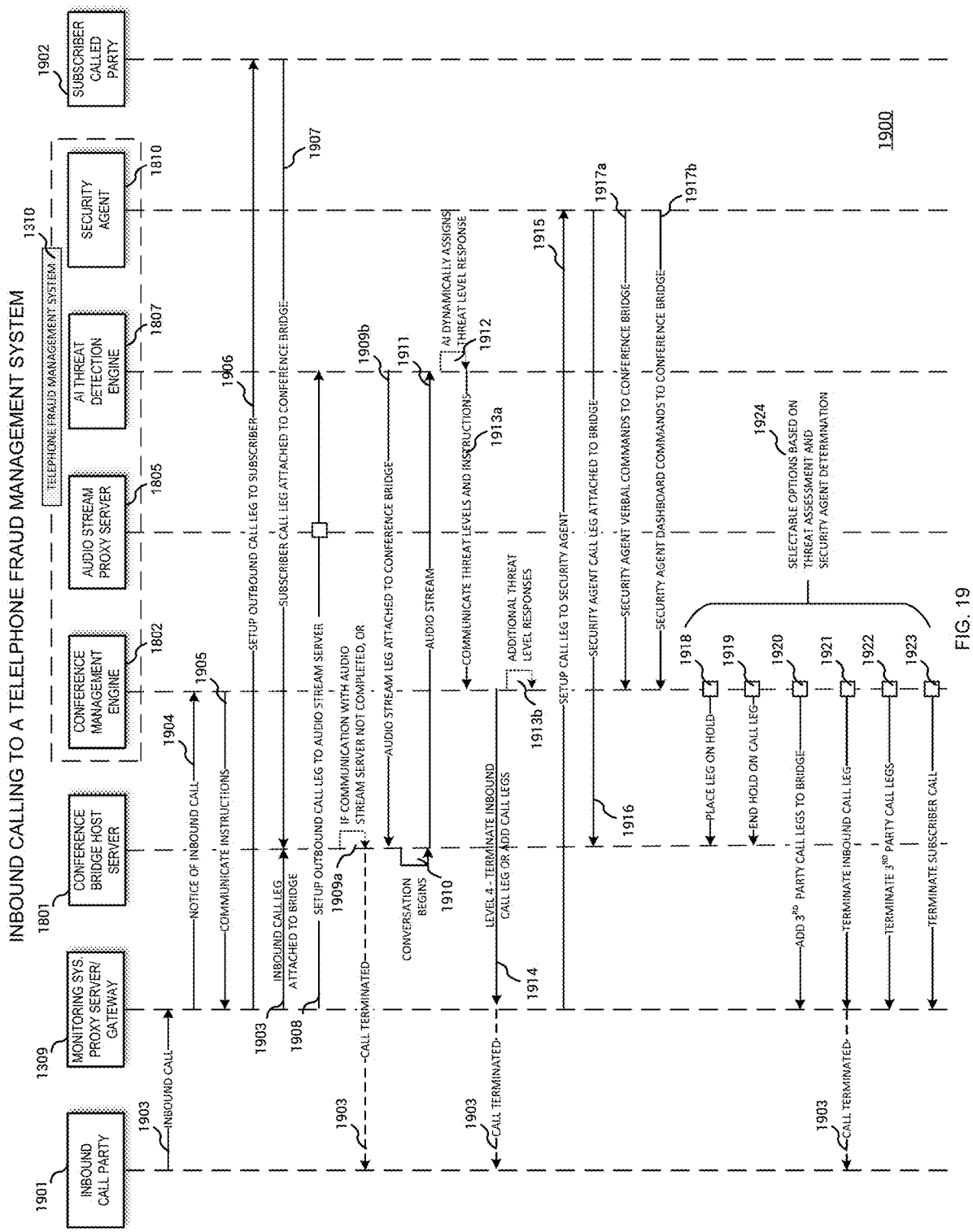
FIG. 19 is an interactive diagram of an illustrative process for establishing and monitoring a telephone call for fraud detection using a conference bridge using the network environment of FIG. 18 in an embodiment.

With regard to FIG. 19, an illustration of an interactive flow diagram 1900 that illustrates voice and data communications and operations of each of the functional computing and telephone and data network systems and services that may comprise a telephone fraud management system 1310 operating in association with an IP telephony data network, such as VoIP/SIP networks, PSTN fixed-line telephone, and/or wireless networks. The computing and telephone services may include a monitoring system proxy server/gateway 1309, conference bridge host server 1801, conference management engine 1802, audio stream proxy server 1805, AI threat detection engine 1807, security agent 1810, inbound call party 1901 (calling party), and recipient called party, a subscriber or user 1902. The monitoring system proxy server/gateway 1309 may receive telephone calls, or a call, from the inbound call party 1901 to a subscriber called party (called party), or subscriber of the telephone fraud-call monitoring and interdiction network 1310, whereby the inbound telephone call 1903 may be processed for safety by the telephone fraud management system 1310.

In the instant example, the inbound call party 1901 initiates the telephone fraud management process by calling the subscriber called party 1902. The inbound call 1903, which may come from a telephone device located on any of a traditional PSTN fixed-line network, wireless network (e.g., mobile phone), or data network, such as VoIP or SIP IP telephony networks, may be routed to the monitoring system proxy server/gateway 1309, as described in FIG. 13. Upon receiving the inbound call 1903, the monitoring system proxy server/gateway 1309 may communicate a notice 1904 to the conference management engine 1802, which may be located either inside or outside the monitoring system proxy server/gateway 1309, seeking instructions regarding handling of the inbound call 1903. The conference management engine 1802 may be operating within the telephone fraud management system 1310, as previously described.

The conference management engine 1802 may communicate 1905 to the monitoring system proxy server/gateway 1309 instructions to setup an outbound call leg 1906 to the subscriber called party 1902 and attach the inbound call party leg 1903 and subscriber call party outbound call leg 1907 to the conference bridge host server 1801 so that both parties are placed into a conference bridge managed by the conference bridge host server 1801. In addition, the conference management engine 1802 may, along with the previous instructions 1905, communicate instructions 1908 (e.g., commands) to the audio stream proxy server 1805 and AI threat detection engine 1807 to join as a network connection or attach as a call leg 1909b to the conference bridge host server 1801, therefore permitting the conversation 1910 and its audio stream 1911 from the call parties 1901 and 1902 to stream to the audio stream proxy server 1805, whereby an Automatic Speech Recognition (ASR) system or speech-to-text engine, as is known in the art, may convert the conversation of the call parties to text for further analysis by the AI threat detection engine 1807. In the event the audio stream proxy server 1805 and/or the AI threat detection engine 1807 do not communicate and establish respective functionality 1909a with the conference bridge host server 1801, the conference bridge host server 1801 may be configured to terminate the inbound call 1903, thereby preventing the inbound call party (a potential fraud call) 1901 from communicating with the called party 1902 unless the AI threat detection engine 1807 is monitoring the call. In an embodiment, a message may be played to the inbound call party 1901 prior to being disconnected (e.g., "the party you are trying to reach is temporarily unavailable, please try again later."). The actions described above, whereby several call legs may be automatically attached to a conference bridge host server 1801 may occur either sequentially in the represented or a non-represented order or simultaneously with or after the receipt of the inbound call 1903. It should be understood that by establishing a conference bridge during a call setup (i.e., connecting the inbound call party 1901 and subscriber called party 1902), the ability to add the outbound call legs (e.g., outbound call leg 1908 to the audio stream proxy server 1805) to monitor the content of the call may be performed seamlessly.

Alternative configurations, such as (i) using deep packet inspection (DPI) to monitor a call and then forcing a 3-way call leg to a security agent or (ii) monitor a direct call between two parties and then opening a conference bridge during the call and placing each of the parties into the conference bridge is technically possible, attempts to perform the telephone call fraud management processes described herein proved to be relatively difficult and unstable for a variety of technical reasons (e.g., call ends if either call party is transferred). The use of the conference bridge in which both a calling party and called party are initially placed into the conference bridge such that additional monitoring and/or security agent legs may be seamlessly added solves many of the technical problems that exist with alternative processes and system configurations.

Once the AI threat detection engine 1807 initiates operation, the conversation 1910 from the audio stream 1911 may be analyzed for fraud-related threat words, phrases, conversation context, speech biometrics, voice pattern recognition, and other such measurements and indicators that may be incorporated into the AI threat detection engine 1807 to determine the safety of a call (i.e., that a subscriber is not being defrauded or scammed out of financial or other valuable assets, amongst other situations). In response to monitoring the call using an artificial intelligence process (e.g., convolutional neural network and/or other estimation or categorization tools), the threat detection engine 1807 may dynamically assign a threat level 1912 or a combination of threat levels to the conversation 1910 and, thereafter, communicate 1913*a* the threat assignment 1912 to the conference management engine 1802. If no threat is determined, then the threat may be a threat level of zero or, based on a pre-determined threat level, assign threat level value(s), as previously described. The threat assignment 1912 may include and communicate one or several instructions 1913*a* to the conference management engine 1802, such as terminate 1914 the inbound call 1903 or additional instructions 1913*b* to setup a call leg 1915 to the security agent 1810.

In the event the security agent call leg 1916 is attached to the conference bridge host sever 1801, the security agent may communicate verbally with one or both call parties 1901 and 1902 and initiate instructions to the conference management engine 1802 in order to facilitate the proper disposition of the call. Based on threat assessments, the security agent 1810 may communicate verbal control instructions 1917*a* to the conference management engine 1802, or, alternatively use a dashboard 1917*b* located on a computer screen to instruct or selectably control 1924 the conference management engine 1802 to: (1) place either the inbound call leg 1903 or subscriber called leg 1907, or any third-party call legs 1920 on hold 1918; (2) remove the hold function 1919 from any call legs placed on hold. In addition, the security agent 1810 may instruct the monitoring system proxy server/gateway 1309 to: (1) add third party call legs, such as police, financial institutions, emergency service 1920, and the like to the conference bridge host server 1801; (2) terminate 1921 the inbound call leg 1903 attached to the conference bridge host server 1801 and the monitoring system proxy server/gateway 1309, (3) terminate third-party call legs 1922; and (4) terminate the subscriber called leg 1923.

In an alternative embodiment, the monitoring system proxy server/gateway 1309 may receive outbound calls from a subscriber as a call party 1902 to a known or unknown called (recipient) party. In such event, the monitoring system proxy server/gateway 1309 and conference bridge host server 1801 may function as previously described, including opening an outbound leg and attaching the outbound call leg to the called party, therefore completing the call and permitting the telephone fraud management system 1310 to function in similar fashion to an inbound call party 1901 as described hereinabove.

It should be understood that various system configurations may be developed that either combine or separate the system's disparate functional elements or combine, separate or reorder the several actions, as described herein, in order to effectuate the functions and processes described herein. It should also be understood, the present interactive flow diagram is representative and, as such, the processes and systems can similarly be applied to inbound and outbound calling using PSTN (fixed-line), wireless, and VoIP/SIP networks.

Pre-Call Notification

One embodiment of a method for playing a pre-call notification may include, in response to a call being initiated between a non-subscriber call participant and a subscriber call participant, determining whether or not to play a pre-call notification based on information associated with the non-subscriber call participant. Playing the pre-call notification to the non-subscriber call participant if a determination to play the call is made. Otherwise, preventing the pre-call notification to be played to the non-subscriber call participant.

The process may further include identifying call metadata as part of the information associated with the non-subscriber call participant prior to connecting the call, and comparing the call metadata with historical information associated with the non-subscriber call participant as stored in at least one database.

Identifying call metadata may further include identifying caller ID information. Determining may further include determining whether the information associated with the non-subscriber call participant is stored in a "bad" caller database, and in response to determining that the information associated with the non-subscriber is stored in a "bad" caller database, preventing the call from being connected.

The process may further include playing a notification to the non-subscriber call participant indicative that the non-subscriber call participant is on a "bad" caller list and that the call will not be connected as a result. Determining may further include determining that the information associated with the non-subscriber call participant is stored in a "good" caller database, and wherein playing the pre-call notification includes playing the pre-call notification periodically. Determining may further include determining that the information associated with the non-subscriber call participant is stored in a "good" caller database, and wherein playing the pre-call notification includes playing the pre-call notification aperiodically.

Determining may further include determining that the non-subscriber call participant is in a "good" caller database, and the process may further include causing monitoring of a call between the subscriber and non-subscriber call participant to be disabled in response to determining that the non-subscriber call participant is in the "good" caller database.

Determining may further include determining that the non-subscriber call participant is not in either of a "good" or "bad" caller database, and, in response to determining that the non-subscriber call participant is not in either of the "good" or "bad" caller databases, playing the pre-call announcement. The process may further include initiating monitoring of the call between the subscriber and non-subscriber call participants.

Determining may further include determining that the information associated with the non-subscriber call participant is not stored in a "good" or "bad" caller database, and wherein playing the pre-call notification includes playing the pre-call notification periodically. Determining may further include determining that the information associated with the non-subscriber call participant is not stored in a "good" or "bad" caller database, and wherein playing the pre-call notification includes playing the pre-call notification aperiodically.

Automatically Interdicting a Call in Response to Determining Potential Fraud Detected One method for interdicting a call between a caller and recipient of the call may include monitoring, by a call managing system, the call determining if a dialogue between the caller and recipient includes language indicative of a potential fraud being perpetrated. In response to the call managing system determining that a probability of a fraud being perpetrated exceeds a fraud threshold level, automatically interdicting the call to enable interrogation of one of the caller or recipient.

Monitoring, by a call managing system, may include analyzing transcribed words of the dialogue between the caller and recipient by an artificial intelligence (AI) engine. Analyzing the transcribed words may include analyzing words from both the caller and recipient in context with one another. The process may further include accessing a database inclusive of a word model descriptive of fraud perpetrated via a call.

Interdicting the call may include adding a third-party call participant to the call via a communications network. Adding the third-party call participant may include adding a human. Adding the third-party call participant may further include adding an interactive voice response (IVR) system to ask initial questions to one or both of the caller and recipient prior to adding the human. The process may further include enabling the third-party to disconnect the call between the caller and recipient in response to determining that a potential fraud is being committed, and enabling the third-party to re-initiate the call between the caller and recipient in response to the third-party determining that no potential fraud is being committed.

The process may further include adding information associated with either the caller or recipient to a "good" caller database in response to the third-party initiating the call, and adding information associated with either the caller or recipient to a "bad" caller database in response to the third-party disconnecting the call.

Interdicting the call may include automatically disconnecting the call between the caller and recipient in response to the call managing system determining that information of either the caller or recipient is stored in a "bad" caller database or determining that a fraud threshold level exceeded is indicative that a fraud being perpetrated is probable. The process may further include communicating a termination message prior to automatically disconnecting the call between the caller and recipient.

The process may further include adding information associated with either the caller or recipient to a "bad" caller database. Determining may include performing a voice analysis of the caller or recipient to generate voice biometrics, and the process may further include comparing the voice biometrics to stored voice biometrics of known "bad" callers to generate a probability of the caller or receiver being a fraudster.

The process may further include automatically preventing the caller or recipient from hearing at least a portion of a conversation from the other in response to the managing system determining that the probability of a fraud being perpetrated exceeds the fraud threshold or a second fraud threshold. Determining that the probability of a fraud being determined may include automatically identifying that the caller or recipient is speaking confidential information, and wherein automatically preventing the caller or recipient from hearing at least a portion of the conversation may include playing a tone or muting the speaker so that the entire confidential information is not communicated to the non-speaker.

Automatically identifying that the caller or recipient is speaking confidential information may include automatically identifying that the caller or recipient is speaking a number associated with an account of a financial institution. Determining that the probability of a fraud being perpetrated exceeds a fraud threshold may include determining that the probability of a fraud being perpetrated exceeds any of a plurality of threat tier levels.

The process may further include performing, by the call managing system, one of a plurality of possible automated call actions associated with each of the threat tier levels. Still yet, the process may further include determining voice biometrics of each of the caller and recipient, and determining whether the voice biometrics of the caller or receiver matches voice biometrics of a subscriber associated with an electronic address associated with the caller or recipient. In response to determining that the voice biometrics does not match voice biometrics of a subscriber, the process may terminate monitoring the call, otherwise, continue monitoring the call.

Automatically Adding 3rd Party to Call if Fraud Detected

One embodiment of a computer-implemented method of interdicting a call may include monitoring a call between a calling party and a called party, and in response to determining that dialog between the calling party and called party is indicative of a potential fraud being perpetrated, automatically adding a third party to the call between the calling and called party to allow the third party to interact with either or both of the calling and called parties.

The process may further include enabling the third party to place either of the calling party or called party on hold. A message may be automatically played to the party that he or she is on hold. The process may further enable the third party to place either the calling party or called party on mute. A message may be automatically played to the party that he or she is on mute.

Monitoring may include executing a neural network to identify words or phrases that are indicative of a potential fraud being perpetrated. The monitoring may include determining whether biometrics of a voice of either the calling party or called party match biometrics of a voice in a "bad" caller database, and, in response to determining that the biometrics of a voice of either the calling party or called party match biometrics of a voice in the "bad" caller database, a third party may be automatically added to the call between the calling and called party to allow the third party to interact with either or both of the calling and called parties.

Enabling a 3rd Party (Security Agent) to Alter Communications Between Call Parties (Mute and Hold)

A computer-implemented method of managing an interdicted call between a calling party and a called party between a calling party and a called party by a third party may include, after forming a three-way call by adding the third party to the call between the calling party and the called party, the third party may be enabled to alter communications between the calling party and called party during the three-way call by a computing device. The computing device may be a computer with communications capabilities over a data or other communications network.

The third party may be enabled to alter communications includes enabling the third party to mute one of the calling party or called party to enable the third party to communicate with the calling party or called party not on mute. The third party may further be enabled to alter communications, including enabling the third party to place on hold one of the calling party or called party to enable the third party to communicate with the calling party or called party not on hold.

The third party may be enabled to unalter communications between the calling party and called party during the three-way call. The process may further be configured to automatically unalter communications between the calling party and called party in response to the third party exiting the three-way call.

The process may further be configured to automatically identify either the calling party or called party as a subscriber, and automatically alter the communication capabilities of the subscriber. Automatically altering may include automatically placing the subscriber on hold. The process may further be configured to enable the third party to take the subscriber off hold. The process may further be configured to form the three-way call at the start of the call between the calling party and called party in response to not identifying the calling party or called party being in either a "good" or "bad" caller database.

IoT

One embodiment of a computer-implemented method of performing an interdiction may be configured to monitor, via a communications device, a conversation between a first person and a second person who are in the physical presence of one another. Audio signals inclusive of the conversation may be transcribed to generate a transcript of the conversation between the first and second persons. The transcription may be processed in real time to determine whether a fraud is being perpetrated on the first person by the second person. In response to determining that a potential fraud is being perpetrated, a notification message may be automatically communicated to a third person, otherwise, continue monitoring, transcribing, and processing the conversation.

Automatically communicating a notification message to a third person may include automatically sending a notification to a security agent about a potential fraud being perpetrated. Communicating a notification message may further include opening a voice channel to the communications device. Monitoring may include monitoring via a device configured to perform interactive voice response functions. Monitoring may further include recording audio in response to determining that a potential fraud is being perpetrated. Monitoring may include executing a neural network to perform real-time analysis to identify when a potential fraud is being perpetrated.

Conducting Call Via a Conference Bridge

One embodiment of a process of monitoring a call may include receiving a call from a calling party to a called party. A conference bridge may be opened. In response to the called party answering the call, the calling party and the called party may be connected with one another via the conference bridge. A communications path may be established with the conference bridge to enable an audio stream to be output from the conference bridge. A threat level may automatically be determined by monitoring verbal communications between the calling party and called party in the audio stream. In response to determining a threat level, a communications link with the conference bridge may be automatically disconnected therefrom or added thereto.

Establishing a communications path may include establishing a communications path with an artificial intelligence (AI) threat detection engine. The AI threat detection engine may transcribe the verbal communications between the calling party and called party. A potential threat made by one of the called party or calling party to the other may be identified by the AI threat detection engine.

Identifying a potential threat may include determining whether a financial or security threat is being made by identifying one or more potential words or phrases that are indicative of a potential threat based on previously training the AI threat detection engine using words or phrases indicative of a potential threat.

Automatically causing a communications link to be added may include establishing a communications link between a security agent and the conference bridge. The security agent may be a human security agent to enable the human security agent to speak with either or both of the calling party and called party via the conference bridge. A user interface may be populated for the security agent to view. The user interface may include a transcription of the verbal communications between the calling party and called party. Words of the transcription determined by an artificial intelligence (AI) threat detection engine to be a factor in determining a threat level may be automatically highlighted. The security agent may be enabled to submit, via the user interface, the transcription and any other information associated with the call between the calling party and called party for future training of the AI threat detection engine. The human security agent may be enabled to control operations of the conference bridge during the call between the calling party and called party via controls provided on the user interface. In an embodiment, the human security agent may be enabled (i) to place either the calling party or called party on hold and (ii) to speak with the party not on hold.

Receiving a call from a calling party may include receiving a call from a subscriber as an outbound call to the called party. Either the calling party or the called party may be automatically disconnected in response to automatically determining a threat level is a threat level at or above a threshold threat level (e.g., threat level 4).

A security agent may be enabled to communicate with either the calling party or called party within the conference bridge after the other of the calling party or called party is automatically disconnected from the conference bridge.

Metadata and/or call content may be stored in a data repository in a data record identified with either the calling party or called party in response to determining that the respective calling party or called party causes a non-zero threat level to be determined, thereby enabling the stored data to be accessed during future calls inclusive of the calling party or called party.

It should be understood that the processes described herein may be executed on one or more servers, computing devices, and/or communications devices that are connected to one or more communications systems, as described herein. In certain embodiments, the processes may be adapted to operate on Internet-of-things devices. Taxonomies may be created and neural networks (or other artificial intelligent algorithms) may be trained and updated using learning algorithms to identify potential frauds, such as financial (e.g., bank account, credit card account, etc.), items (e.g., homes, cars, etc.). The processing of communications signals (e.g., telephone call dialog between two people) may be performed real-time so as to enable an interdiction of the call (e.g., add a security agent to the call), and the system may provide certain call controls to the $3^{rd}$ party.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The invention claimed is:

1. A method of establishing a call, said method comprising:
   receiving a call from a calling party to a called party;
   opening a conference bridge;
   placing the call from the calling party into the conference bridge;
   establishing an outbound leg of the conference bridge; and
   placing an outbound call via the outbound leg of the conference bridge to the called party such that when the called party answers the outbound call from the conference bridge, the calling party and the called party are connected with one another via the conference bridge;
   establishing another communications path with the conference bridge to enable an audio stream to be output from the conference bridge by establishing a communications path with an artificial intelligence (AI) threat detection engine;
   transcribing, by the AI threat detection engine, the verbal communications between the calling party and called party to form a transcription; and
   identifying, by the AI threat detection engine, a potential threat made by one of the called party or calling party to the other party;
   automatically determining a threat level by monitoring verbal communications between the calling party and called party in the audio stream; and
   in response to determining a threat level, automatically causing a communications path with the conference bridge to be disconnected therefrom or added thereto.

2. The method according to claim 1, wherein receiving a call from a calling party to a called party includes receiving a call at a call center.

3. The method according to claim 1, wherein identifying a potential threat includes determining whether a financial or security threat is being made by identifying one or more potential words or phrases that are indicative of a potential threat based on previously training the AI threat detection engine using words or phrases indicative of a potential threat.

4. The method according to claim 1, further comprising automatically disconnecting either the calling party or the called party in response to automatically determining that the determined threat level is a threat level at or above a threshold threat level.

5. The method according to claim 1,
wherein in response to automatically determining a threat level, automatically causing a communications link with the conference bridge to be added thereto includes automatically establishing a communications path to be added between a security agent and the conference bridge.

6. The method according to claim 5, further comprising populating a user interface for the security agent to view the transcription of the verbal communications between the calling party and called party.

7. The method according to claim 6, further comprising enabling the human security agent to control operations of the conference bridge during the call between the calling party and called party via controls provided on a user interface.

8. The method according to claim 7, wherein enabling the human security agent to control operations of the conference bridge via controls provided on a user interface include enabling the human security agent to place either the calling party, called party, or both parties on hold, and enabling the human security agent to speak with the party not on hold.

9. The method according to claim 5, further comprising enabling the security agent to place either of the calling party or called party on hold.

10. The method according to claim 1, wherein receiving a call from a calling party includes receiving a call from a subscriber as an outbound call to the called party.

11. The method according to claim 1, further comprising:
monitoring, by a call managing system, the call between the calling party and the called party to determine if a dialogue therebetween includes language indicative of a potential fraud being perpetrated; and
in response to the call managing system determining that a probability of a fraud being perpetrated exceeds a fraud threshold level, automatically interdicting the call to enable interrogation of one of the caller or recipient.

12. The method according to claim 11, wherein monitoring, by the call managing system, includes analyzing transcribed words of the dialogue between the caller and recipient by an artificial intelligence (AI) engine.

13. The method according to claim 11, wherein monitoring, by the call managing system, includes analyzing voice biometrics of the dialogue between the caller and recipient by an AI engine.

14. The method according to claim 11, wherein automatically interdicting the call includes automatically adding a third-party call participant to the conference bridge during the call between the calling party and the called party via a communications network.

15. The method according to claim 14, wherein adding the third-party call participant includes adding a human to the conference bridge.

16. The method according to claim 15, wherein adding the third-party call participant further includes adding an interactive voice response (IVR) system to ask initial questions to one or both of the calling party and the called party prior to adding the human.

17. The method according to claim 15, wherein adding the third-party call participant further includes adding an AI engine to the conference bridge.

18. The method according to claim 14, further comprising:
enabling the third-party participant to disconnect the call between the calling party and called party in response to determining that a potential fraud is being committed; and
enabling the third-party participant to re-initiate the call between the caller and recipient in response to the third-party participant determining that no potential fraud is being committed.

19. The method according to claim 18, further comprising enabling the third-party participant to add information associated with either the caller or recipient to a "bad" caller database.

20. The method according to claim 11, wherein determining that the probability of a fraud being perpetrated exceeds a fraud threshold level includes determining that the probability of a fraud being perpetrated exceeds any of a plurality of threat tier levels.

* * * * *